United States Patent [19]

Edwards et al.

[11] 4,117,498

[45] Sep. 26, 1978

[54] MAGNETIC PRINTING PROCESS AND APPARATUS

[75] Inventors: Donald William Edwards, Wilmington, Del.; Emery John Gorondy, Chadds Ford, Pa.

[73] Assignee: E. I. Du Pont de Nemours and Company, Wilmington, Del.

[21] Appl. No.: 771,062

[22] Filed: Feb. 25, 1977

Related U.S. Application Data

[63] Continuation-in-part of Ser. No. 672,553, Mar. 31, 1976, abandoned.

[51] Int. Cl.[2] .................... G03G 19/00; G01D 15/12

[52] U.S. Cl. .................... 346/74.1; 118/652; 358/301; 427/48

[58] Field of Search .................... 346/74.1; 358/301; 427/47, 48, 271; 118/652

[56] References Cited

U.S. PATENT DOCUMENTS

| | | | |
|---|---|---|---|
| 2,971,916 | 2/1961 | Schleicher | 346/74.1 |
| 3,627,682 | 12/1971 | Hall, Jr. | 346/74.1 |
| 3,882,507 | 5/1975 | Trimble et al. | 346/74.1 |
| 3,893,416 | 7/1975 | Eichorn | 118/652 |
| 3,965,478 | 6/1976 | Schloemann | 346/74.1 |

FOREIGN PATENT DOCUMENTS

| | | | |
|---|---|---|---|
| 242,516 | 9/1969 | U.S.S.R. | 346/74.1 |

OTHER PUBLICATIONS

IBM Tech. Disc Bull, vol. 17, #3, p. 828, 8/74 "Magnetographic Copier", L. T. Romankier.

*Primary Examiner*—Jay P. Lucas

[57] ABSTRACT

Magnetic printing process, and apparatus for carrying out same, comprising:

(a) forming a magnetic image on a ferromagnetic material which is imposed on an electrically conductive support;

(b) developing the magnetic image by decorating same with a ferromagnetic toner comprising a ferromagnetic component, a dye and/or chemical treating agent and a water-soluble or water-solubilizable, preferably thermoplastic, resin which substantially encapsulates the ferromagnetic component and the dye and/or treating agent;

(c) transferring the developed image to a substrate;

(d) permanently fixing the dye and/or chemical treating agent of the image on the substrate; and (e) removing the ferromagnetic component and the resin from the image on the substrate.

88 Claims, 16 Drawing Figures

FIG. 1
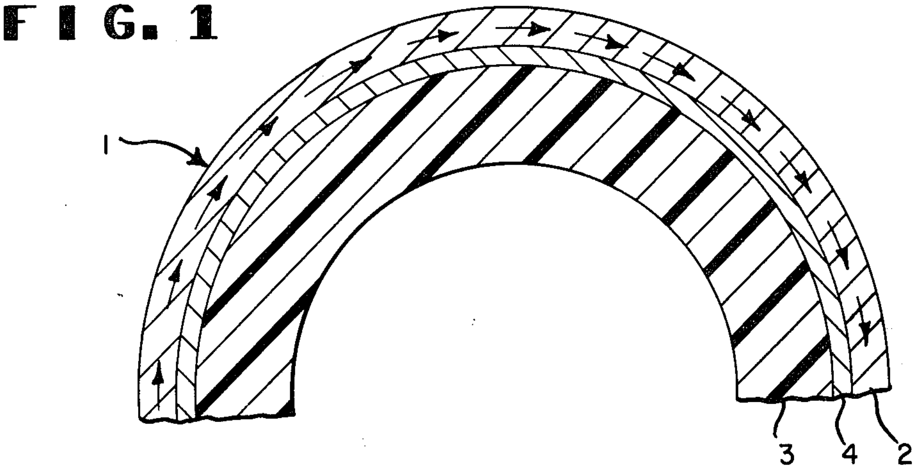
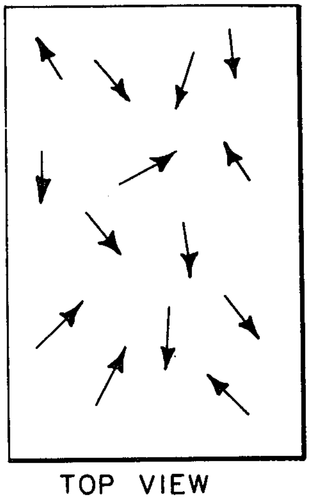
FIG. 2A
TOP VIEW
ORIENTING MAGNETS
FIG. 2B
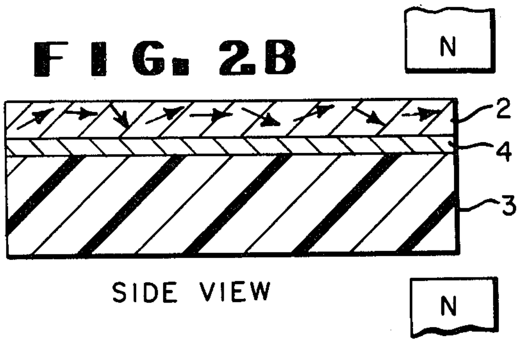
SIDE VIEW
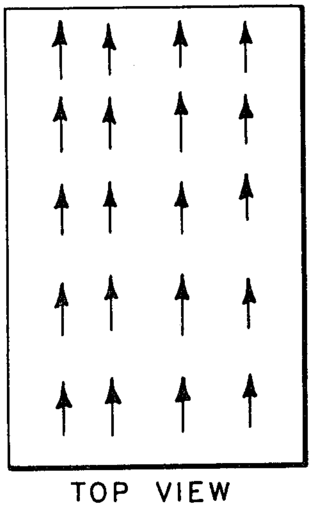
FIG. 2C
TOP VIEW
FIG. 2D
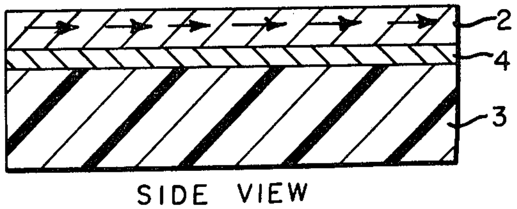
SIDE VIEW

MAGNETIC PRINTING PROCESS AND APPARATUS

CROSS-REFERENCE TO RELATED APPLICATION

This is a continuation-in-part of application Ser. No. 672,553 filed Mar. 31, 1976, and abandoned June 30, 1977.

BACKGROUND OF THE INVENTION

1. Field of the Invention

This invention relates to magnetic printing processes and devices.

2. Description of the Prior Art

One form of copying process in wide usage is the electrostatic copying process. Operation of such a process may provide difficulties in that large black areas may not be amenable to copying and the document to be copied may have to be reimaged each time a copy is made. The overcoming of these difficulties may be economically prohibitive. It is well known that audio signals and digital data can be recorded on magnetic materials. Magnetic field configurations in the form of alphabetical characters and pictures can also be produced by selective magnetization or demagnetization of the surface of a ferromagnetic chromium dioxide film. The resultant fields are strong enough to attract and hold small magnetic particles such as iron powder. The development, that is, the making visible, of such a latent magnetic image can be effected by contacting the image surface with a magnetic developer, usually referred to as a magnetic toner, consisting of ferromagnetic particles and pigments encapsulated in a thermoplastic resin binder. Such a development process is commonly known as decoration of the latent magnetic image. The developed image can then be transferred to and fixed on paper, thus providing a black-on-white copy of the latent image. Operation of such magnetic processes, however, may not be completely free of difficulties. For example, since most magnetic toner particles are attracted by both electrostatic and magnetic fields, stray electrostatic charges which are present on the magnetic surface or toner particles may interfere with the interaction of the magnetic image and the magnetic toner particles. More specifically, a portion of the magnetic surface other than that containing the magnetic image may attract enough magnetic toner particles to render unsatisfactory the paper print which subsequently is produced.

There is extensive prior art in the fields of magnetic recording tapes and thermomagnetic recording. U.S. Pat. No. 3,476,595 discloses a magnetic recording tape which is coated with a thin layer of a cured complex of silica and a preformed organic polymer containing a plurality of alcoholic hydroxy groups. The disclosure includes coated, ferromagnetic, chromium dioxide, magnetic recording tapes. Discussions of acicular chromium dioxide and magnetic recording members bearing a layer of such material may also be found in U.S. Pat. Nos. 2,956,955 and 3,512,930. U.S. Pat. No. 3,554,798 discloses a magnetic recording member which is relatively transparent to light (transmits 5 to 95%) and which includes a plurality of discrete areas of hard magnetic particulate material supported thereon and bound thereto. A magnetically hard material is a material which is permanently magnetizable below the Curie point of the material, as opposed to a magnetically soft material which is substantially non-permanently magnetizable under similar conditions below the Curie point of the material. Chromium dioxide is disclosed as an example of a hard magnetic material. Decoration of the image may be effected by means of a magnetic pigment, for example, a dilute, alkyd-oil/water emulsion, carbon black-based printing ink. U.S. Pat. No. 3,522,090 is similar in disclosure to U.S. Pat. No. 3,554,798 in that it also discloses a light-transparent recording member. However, it also discloses that the magnetic material which is capable of magnetization to a hard magnetic state (on the recording member) may have a coating of a reflective material which is so disposed that the magnetic material is shielded from exposing radiation while the adjacent uncoated portion of the recording member transmits 10 to 90% of the exposing radiation. The reflective coating can be a metallic reflector, such as aluminum, or a diffuse reflective pigment, such as titanium dioxide. U.S. Pat. No. 3,555,556 discloses a direct thermomagnetic recording (TMR) process wherein the document to be copied is imaged by light which passes through the document. U.S. Pat. No. 3,555,557 discloses a reflex thermomagnetic recording process wherein the light passes through the recording member and reflects off of the document which is to be copied. Thus, in the direct process, the document must be transparent but the recording member need not be transparent, whereas in the reflex process, the recording member must be transparent but the document need not be transparent. For the recording member to be transparent, it must have regions which are free of magnetic particles, that is, a non-continuous magnetic surface must be used.

U.S. Pat. No. 3,627,682 discloses ferromagnetic toner particles, for developing magnetic images, that include binary mixtures of a magnetically hard material and a magnetically soft material, an encapsulating resin and, optionally, carbon black or black or colored dyes to provide a blacker or colored copy. "Nigrosine" SSB is disclosed as an example of a black dye. The encapsulating resin aids transfer of the decorated magnetic image to paper and can be heated, pressed or vapor softened to adhere or fix the magnetic particles to the surface fibers of the paper. Ferromagnetic toner particles of the type disclosed in U.S. Pat. No. 3,627,682 are disclosed as being useful in the dry thermomagnetic copying process of U.S. Pat. No. 3,698,005. The latter patent discloses such a dry thermomagnetic copying process wherein the magnetic recording member is coated with a polysilicic acid. The use of the polysilicic acid coating on the recording member is particularly useful when the magnetic material on the recording member comprises a plurality of discrete areas of particulate magnetic material because a greater number of clean copies can be produced. The polysilicic acid, which is relatively nonconductive, exhibits good non-stick properties. Thus, toner particles which are held to the surface of the recording member by nonmagnetic forces can be easily removed without removing the toner particles which are held to the surface of the recording member by magnetic forces. U.S. Pat. No. 2,826,634 discloses the use of iron or iron oxide magnetic particles, either alone or encapsulated in low-melting resins, for developing magnetic images. Such toners have been employed to develop magnetic images recorded on magnetic tapes, films, drums and printing plates.

Japanese 70/52044 discloses a method which comprises adhering iron particles bearing a photosensitive diazonium compound onto an electrophotographic material to form an image, transferring the image onto a support having a coupler which is able to form an azo dye by reaction with the diazonium compound, reacting the diazonium compound and the coupler and thereafter removing the iron particles. U.S. Pat. No. 3,530,794 discloses a magnetic printing arrangement wherein a thin, flexible master sheet having magnetizable, character-representing, mirror-reversed printing portions is employed in combination with a rotary printing cylinder. The master sheet, which consists of a thin, flexible non-magnetizable layer, such as paper, is placed on top of and in contact with a layer of iron oxide or ferrite which is adhesively attached to a base sheet. The combined layer and base sheet are imprinted, for example, by the impact of type faces, so that mirror-reversed, character representing portions of the iron oxide layer adhere to the non-magnetizable layer, thus forming magnetizable printing portions on same. Thereafter, the printing portions are magnetized and a magnetizable toner powder, such as iron powder, is applied to and adheres to the magnetized printing portions. The powder is then transferred from the printing portions to a copy sheet and permanently attached thereto, for example, by heating. U.S. Pat. No. 3,052,564 discloses a magnetic printing process employing a magnetic ink consisting of granules of iron coated with a colored or uncolored thermoplastic wax composition. The magnetic ink is employed in effecting the transfer of a printed record, using magnetic means, to paper. U.S. Pat. No. 3,735,416 discloses a magnetic printing process wherein characters or other data to be printed are formed on a magnetic recording surface by means of a recording head. A magnetic toner which is composed of resin-coated magnetic particles is employed to effect transfer of the characters or other data from the recording surface to a receiving sheet. U.S. Pat. No. 3,250,636 discloses a direct imaging process and apparatus wherein a uniform magnetic field is applied to a ferromagnetic imaging layer; the magnetized, ferromagnetic imaging layer is exposed to a pattern of heat conforming to the shape of the image to be reproduced, the heat being sufficient to raise the heat portions of the layer above the Curie point temperature of the ferromagnetic imaging layer so as to form a latent magnetic image on the imaging layer; the latent magnetic image is developed by depositing a finely divided magnetically attractable material on the surface of the ferromagnetic imaging layer; the imaging layer is uniformly heated above its Curie point temperature after the development to uniformly demagnetize it; and, finally, the loosely adhering magnetically attractable material is transferred from the imaging layer to a transfer layer.

German Pat. No. 2,452,530 discloses electrophotographic toners comprising a magnetic material coated with an organic substance containing a dye which vaporizes at 100° to 220° C, preferably 160° to 200° C, at atmospheric pressure. The magnetic material is preferably granular iron and/or iron oxide and the coating is a water-insoluble polymer melting at about 150° C, e.g., polyamides, epoxy resins and cellulose ethers and esters. Both basic and disperse dyes can be used in the toners. The toners are from 1 to 10 microns in diameter and may also contain silicic acid as anti-static agent. Colored or black copies are formed by toner development of the latent image on a photo-conducting sheet of ZnO paper, followed by transfer of the dye in the vapor phase to a receiving sheet by application of heat and pressure.

OBJECTS AND SUMMARY OF THE INVENTION

In carrying out prior art thermomagnetic recording processes, generally, only reddish-brown or black images can be obtained on paper because of the dark hard magnetic components, for example, the iron oxides ($\gamma$-$Fe_2O_3$ or $Fe_3O_4$), and the dark soft magnetic components, for example, iron, in the ferromagnetic toners employed therein; because the magnetic components are retained in and may be essential to the formation of the visible images; and because the magnetic components are bound to the paper by the encapsulating resins employed in the ferromagnetic toners. It is an object of the present invention to provide magnetic printing processes and devices which can be used to print, in a broad range of colors, if desired, a variety of substrates, including textiles, such as fabric and yarn, film, including paper, metal and wood. It also is an object to provide such processes and devices which utilize either hard magnetic components or soft magnetic components or a mixture of hard and soft magnetic components. Another object is to provide a magnetic printing process which includes the step of aqueous scouring the print to remove the hard and/or soft magnetic components and the encapsulating resin for such magnetic components. It is a further object to provide such a process by means of which can be obtained a print which is substantially free of hard and soft magnetic components and encapsulating resin. Still another object is to provide a process for applying chemical treating agents to a substrate. A further object is to provide a process and an appropriate device by means of which a sharp print can be obtained, that is, without objectionable background caused by ferromagnetic toner particles undesirably adhering, for example, electrostatically, to certain areas of the ferromagnetic material during formation of the magnetic image thereon. The term "textile" is intended to include any natural or synthetic material, such as natural or regenerated cellulose, cellulose derivatives, natural polyamides, such as wool, synthetic polyamides, polyesters, acrylonitrile polymers and mixtures thereof, which is suitable for spinning into a filament, fiber or yarn. The term "fabric" is intended to include any woven, knitted or nonwoven cloth comprised of natural or synthetic fibers, filaments or yarns.

In summary, the invention herein resides in a magnetic printing process and a device for carrying out same, which process comprises the steps:

(a) forming a magnetic image on a ferromagnetic material which is imposed on an electrically conductive support;

(b) developing the magnetic image by decorating same with a ferromagnetic toner comprising a ferromagnetic component, a dye and/or chemical treating agent and a water-soluble or water-solubilizable, preferably thermoplastic, resin which substantially encapsulates the ferromagnetic component and the dye and/or treating agent;

(c) transferring the developed image to a substrate;

(d) permanently fixing the dye and/or chemical treating agent of the image on the substrate; and (e) removing the ferromagnetic component and the resin from the image on the substrate. Preferred embodiments of the process include those wherein the developed image, after being transferred to the substrate in step (c), is adhered thereto by means of heat and/or water, with or without pressure, which fuses and/or partially dissolves the encapsulating resin; wherein the developed image is transferred to a first substrate, such as paper, in step (c) and adhered thereto and then transferred, by heat-transfer means, to a second substrate whereon, in step (d), the dye and/or chemical treating agent of the image and permanently fixed; and wherein the removal of ferromagnetic component and resin is effected in step (e) by means of an aqueous scour.

BRIEF DESCRIPTION OF THE DRAWINGS

FIG. 1 represents an enlarged cross-sectional view of a cylindrical, continuously surface-coated, conductive magnetic printing member.

FIGS. 2A and 2B represent top and side views, respectively, in rectilinear form, of the printing member of FIG. 1 before orientation of the acicular $CrO_2$ of layer 2;

FIGS. 2C and 2D represent the same views after orientation of the acicular $CrO_2$.

FIG. 5 depicts the formation of a latent magnetic image on the printing member by Xenon flashing an appropriate film positive.

FIG. 6 depicts the printing member having the latent magnetic image imposed thereon.

FIG. 7 depicts the printing member, after the latent magnetic image has been decorated with ferromagnetic toner particles, as it is about to be brought into contact with the substrate which is to be printed.

FIG. 8 depicts the substrate after the image consisting of ferromagnetic toner particles has been transferred thereto from the magnetic printing member.

FIG. 9 depicts the substrate after the image has been adhered thereto.

DETAILED DESCRIPTION OF THE INVENTION

Figure 3A:
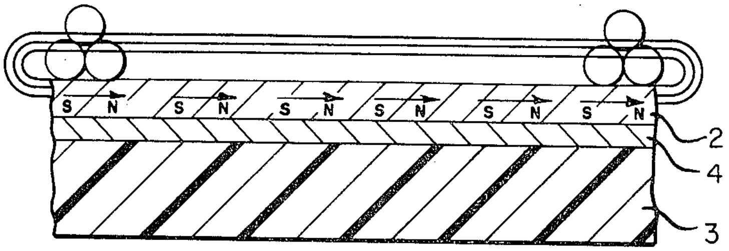
FIG. 3A represents a side view, in rectilinear form, of the acicular $CrO_2$ of layer 2 but before the $CrO_2$ is magnetically structured.

The formation of the magnetic image on a ferromagnetic material can be carried out by techniques well known in the art of magnetic recording. One of the unusual features of the instant invention is the substantial absence of background dye and/or chemical treating agent in the substrate being printed. By background dye and/or chemical treating agent is meant the presence of dye and/or agent on undesirable areas of the substrate which has been subjected to the magnetic printing process. It has been discovered that such background can be substantially avoided if any charge on the ferromagnetic material is dissipated, at some stage of the magnetic printing process prior to transfer of the decorated image to the substrate, the purpose being to preclude the affixing of and/or to facilitate the removal of ferromagnetic toner on and/or from areas of the ferromagnetic material other than those areas where the desired image appears. It has been observed that such undesirable tone deposition on the ferromagnetic material may occur during the aforesaid image decorating step (b) if the toner or ferromagnetic material is electrostatically charged. Further to the aforesaid discoveries and observation, formation of such an electrostatic charge can be avoided by imposing ferromagnetic material having adequate charge dissipating conductance through its thickness on an electrically conductive support. Alternatively, the undesirable electrostatic charge built up on the ferromagnetic material can be dissipated by subjecting the ferromagnetic material to treatment with an external electrostatic charge dissipating means, such as an AC corona, prior to the aforesaid image transfer step (c). By using an electrostatic charge dissipating means, any triboelectric charges developed on the toner particles are also eliminated. Hence, it is preferable to employ both an electrically conductive support and the electrostatic charge dissipating means.

It is to be understood that the above discussion of background avoidance is directed to the production of prints requiring an unstained or untreated substrate background. Background would not be undesirable if the magnetic printing process were used to print substrates in solid shades or to treat, with a chemical treating agent, the entire surface of the substrate.

Another unusual feature of the present invention resides in the discovery that the decorated image resulting from the aforesaid step (b) can be transferred by pressure, electrostatic or magnetic means, or a combination thereof, directly to the substrate which is to be printed, for example, a textile fabric, or it can be transferred to a first substrate, for example, paper, and subsequently, if desired, after storage, transferred, by well known procedures, to a second substrate, the ultimate substrate which is to be printed.

A further unusual feature of the invention resides in the discovery that the printed substrate, after completion of the aforesaid step (d), can be conveniently and facilely aqueous scoured to remove and, if desired, recover, the ferromagnetic component and the resin originally present in the toner. Particularly in the case of dye-containing toners, this feature, coupled with previously-discussed features, makes possible the utilization of magnetic recording techniques to effect the color printing, in one or more colors, of a variety of substrates. Moreover, in the case of chemical treating agent-containing toners, with or without dye, this invention makes possible the utilization of magnetic printing techniques for the application of a variety of chemical treating agents to a variety of substrates.

Although the invention herein resides in magnetic printing process and devices, since an important aspect of the invention process resides in the use of a particular type of ferromagnetic toner, the following discussion of toners is provided. The ferromagnetic toner comprises:

(a) at least one ferromagnetic component;

(b) at least one member of the group consisting of dye and chemical treating agent; and (c) a readily fusible, water-soluble or water-solubilizable resin which substantially encapsulates (a) and (b). A preferred embodiment includes such toners comprising, based on the total weight of (a), (b) and (c), 14 to 83% of (a), 0.10 to 25% of (b) and 9 to 74% of (c) and having a resin to ferromagnetic component ratio of 0.11 to 3.3. An especially preferred embodiment is one wherein there is 55 to 70% of (a), 0.10 to 15% of (b) and 30 to 40% of (c) and which has a resin to ferromagnetic component ratio of 0.40 to 1.0.

The ferromagnetic component can consist of hard magnetic particles, soft magnetic particles or a binary mixture of hard and soft magnetic particles. The magnetically soft particles can be iron or another high-permeability, low-remanence material, such as iron carbonyl, certain of the ferrites, forexample, (Zn, Mn)$Fe_2O_4$, or permalloys. The magnetically hard particles can be an iron oxide, preferably $Fe_3O_4$, $\gamma$-$Fe_2O_3$, other ferrites, for example, $BaFe_{12}O_{19}$, chi-iron carbide, chromium dioxide or alloys of $Fe_3O_4$ and nickel or cobalt. Preferred mixtures of soft and hard magnetic particles include mixtures of iron particles and either $Fe_3O_4$ particles or $CrO_2$ particles. Magnetically hard and magnetically soft particles are substances which are, respectively, permanently magnetizable and substantially non-permanently magnetizable under similar conditions below the Curie point of the substances. A magnetically hard substance has a high-intrinsic coercivity, ranging from a few tens of oersteds (Oe), for example, 40 Oe, to as much as several thousand oersteds and a relatively high remanence (20 percent or more of the saturation magnetization) when removed from a magnetic field. Such substances are of low permeability and require high fields for magnetic saturation. Magnetically hard substances are used as permanent magnets for application such as loud speakers and other acoustic transducers, in motors, generators, meters and instruments and as the recording layer in most magnetic tapes. A magnetically soft substance has low coercivity, for example, one oersted or less, high permeability, permitting saturation to be obtained with a small applied field, and exhibits a remanence of less than 5 percent of the saturation magnetization. Magnetically soft substances are usually found in solenoid cores, recording heads, large industrial magnets, motors and other electrically excited devices wherein a high flux density is required. Preferred soft magnetic substances include iron-based pigments, such as carbonyl iron, iron flakes and iron alloys.

The dye which is used in the ferromagnetic toner can be selected from virtually all of the compounds mentioned in the Colour Index, Vols. 1, 2 and 3, 3rd Edition, 1971. Such dyes are of a variety of chemical types; the choice of dye is determined by the nature of the substrate being printed. For example, premetalized dyes (1:1 and 2:1 dye: metal complexes) are suitable for synthetic polyamide fibers. The majority of such dyes are monoazo or disazo dyes; a lesser number are anthraquinone dyes. Such dyes can have or be free from water-solubilizing groups, such as sulfonic acid and carboxy groups, and sulfonamido groups. Acid wool dyes, including the monoazo, disazo and anthraquinone members of this class which bear water-solubilizing sulfonic acid groups, may also be suitable for synthetic polyamide textiles. Disperse dyes can be used for printing synthetic polyamide, polyester and regenerated cellulosic fibers. A common feature of such dyes is the absence of water-solubilizing groups. However, they are, for the most part, thermosoluble in synthetic polymers, notably polyesters, polyamides and cellulose esters. Disperse dyes include dyes of the monoazo, polyazo, anthraquinone, styryl, nitro, phthaloperinone, quinophthalone, thiazine and oxazine series and vat dyes in the leuco or oxidized form. For polyacrylonitrile and acid-modified polyester fibers, preference usually is given to cationic dyes containing a carbonium ion or a quaternary ammonium group. Cationic-disperse dyes, that is, water-insoluble salts of dye cations and selected arylsulfonate anions, are well-known in the art for dyeing acid-modified polyester and acrylic fibers. Cotton fibers can be printed with vat dyes and with fiber reactive dyes, including those which are employed for polyamide fibers. Other suitable dyes for cotton are the water-soluble and water-insoluble sulfur dyes. Water-swellable cellulosic fibers, or mixtures or blends thereof with synthetic fibers, can also be uniformly printed with water-insoluble disperse dyes using aqueous ethylene glycol or polyethylene glycol type solvents, as described in the art.

The amount of dye present in the ferromagnetic toner can vary over a wide range, for example, 0.1 to 25% by weight of the total weight of essential components (a), (b) and (c) in the toner. Particularly good results can be obtained when the amount is 0.1 to 15% by weight.

A wide variety of chemical treating agents, such as flame-retarding agents, biocides, ultraviolet light absorbers, fluorescent brighteners, dyeability modifiers and soil-release and water-proofing agents, can be present in the ferromagnetic toner. Such agents have utility on cotton, regenerated cellulose, wood pulp, paper, synthetic fibers, such as polyesters and polyamides, and blends of cotton with polyester or polyamide. By dyeability modifier is meant a chemical substance that can be chemically or physically bound to the substrate, such as a fiber, to change the dyeability of the substrate, for example, the degree of dye fixation or the type or class of dye that can be employed. A specific example of a useful dyeability modifier is a treating agent which provides printed chemical resists, that is, printed areas which remain unstained during a subsequent dyeing operation. Since many chemical treating agents, including those of the aforesaid types, are well-known in the prior art, no further discussion thereof is necessary. The chemical treating agent in the toner can be present in the same amount as the dye, that is, 0.1 to 25%, preferably 0.1 to 15%, of the total weight of essential components (a), (b) and (c).

The resin which is used in the ferromagnetic toner includes any of the known, readily fusible, natural, modified natural or synthetic resins or polymers which are soluble or solubilizable in water, that is, either directly soluble in water or made soluble through a simple chemical treatment. The solubility in water must be such that the ferromagnetic component and the encapsulating resin can be removed from the substrate, after permanent fixation of the dye and/or chemical treating agent, by an aqueous scour, in a short time, as will be described in greater detail hereinafter. Examples of solubilizable resins are those resins or polymers which contain salt-forming groups, which thereby render them soluble in an alkaline aqueous solution, and those which can be hydrolyzed by acids or alkalis so as to become water-soluble. Exemplary of useful natural resins are rosin (also known as colophony) and modified derivatives thereof, such as rosin esterified with glycerin or pentaerythritol, dimerized and polymerized rosin, unsaturated or hydrated rosin and derivatives thereof and rosin, and derivatives thereof, which has been modified with phenolic or maleic resins. Other natural resins with properties similar to rosin, such as dammar, copal, sandarak, shellac and tolloel, can be successfully used in the ferromagnetic toners.

Examples of synthetic resins which are useful include vinyl polymers, such as polyvinyl alcohol and polyvinyl acetate copolymers; polyacrylic acid and polyacrylamide; methyl-, ethyl- and butyl methacrylate-methacrylic acid copolymers; styrene-maleic acid copolymers; methyl vinyl ether-maleic acid copolymers; carboxyester lactone polymers; polyethylene oxide polymers; nonhardening phenolformaldehyde copolymers; polyester resins, such as linear polyesters prepared from dicarboxylic acids and alkylene glycols, for example, from phthalic, terephthalic, isophthalic or sebacic acid and ethylene glycol; cellulose ethers, such as hydroxypropylcellulose; polyurethanes; and polyamides, such as those prepared from sebacic acid and hexamethylenediamine.

The resin used in the toner is preferably of the thermoplastic type in order to permit adhesion thereof to the substrate by melting or fusion. particularly preferred resins are adducts of rosin, a dicarboxylic acid or anhydride, a polymeric fatty acid and an alkylene polyamide; hydroxypropylcellulose prepared by reacting 3.5 to 4.2 moles of propylene oxide per D-glucopyranosyl unit of the cellulose; and polyvinyl acetate copolymers having a free carboxy group content equivalent to 0.002 to 0.01 equivalent of ammonium hydroxide per gram of dry copolymer. The preferred resins possess a high electrical resistivity for good transfer in an electrostatic field, have good infrared and steam fusion properties and do not interfere with penetration of the dye or chemical treating agent into the substrate during the final (permanent) fixation operation. Moreover, after the dye and/or chemical treating agent has been fixed within the substrate, the resin must be easily removable in an aqueous washing operation in a short time, for example, in less than five minutes at less than 100° C, preferably in less than 60 seconds at less than 90° C.

The ferromagnetic toner can be prepared by intimately mixing together, for example, by ball milling or by high frequency viscous milling, an aqueous solution or slurry containing the desired proportions of dye(s) and/or chemical treating agent(s), ferromagnetic component(s) and encapsulating resin and then spray-drying to remove the water. Particularly good results usually can be obtained by ball milling for 1–17 hours at about 60 percent by weight nonvolatiles content. The solution or dispersion resulting from ball milling is separated from the ceramic balls, sand or other grinding means, diluted with water and spray-dried at a nonvolatiles content of 10 to 40 percent by weight. Spray-drying is accomplished by conventional means, for example, by dropping the solution or dispersion onto a disk rotating at high speed or by using a conventional spray-drying nozzle, as described in the art. Spray-drying consists of atomizing the aqueous toner solution or dispersion into small droplets, mixing these with a gas, and holding the droplets in suspension in the gas until the water in the droplets evaporates and heat and surface tension forces cause the resin particles in each droplet to coalesce and encase the dye and/or treating agent included in the droplet. Most frequently, spray-drying is carried out with air as the gas for the drying step. The gas is heated sufficiently to remove the water and so that the many small particles in any one droplet formed during atomization can come together to form a small, hard, spherical toner particle which entraps any dye and/or treating agent initially included within that droplet.

By maintaining uniformity of dispersion of dye and resin in the water and by controlling solids concentration in the final dye-water mixture, the particle size of the toner can be controlled by the size of the droplet produced by the atomizing head in the spray-drying equipment. Moreover, by controlling the toner slurry feed rate, the viscosity of the toner slurry, the spray-drying temperature and the disc rpm for a disc atomizer, the pressure for a single-fluid nozzle atomizer or the pressure and air to feed ratio for a two-fluid nozzle atomizer, spherical toner particles having diameters within the range of 2 to 100 microns, preferably 10 to 25 microns, can be readily obtained. Toners passing a 200 mesh screen (U.S. Sieve Series), thus being less than 74 microns in the longest particle dimension, are especially useful.

Other suitable well known encapsulation processes can be employed to produce the ferromagnetic toner. These include coacervation and interfacial polymerization techniques.

The relative amounts of resinous material and ferromagnetic component in the toner usually are determined by the desired adhesive and magnetic properties of the toner particle. Generally, the ratio of resinous material to ferromagnetic material is 0.11 to 3.3, preferably 0.40 to 1.0. The preferred ratio especially provides toners having good decoration, transfer and fusion properties.

It is to be understood that the ferromagnetic component, dye and/or chemical treating agent and encapsulating resin are essential components of the toner and the aforesaid percentages are based on the combined weights of these essential components. In some cases, it may be advisable to add one or more known chemical assistants to enhance the functional behavior of the ferromagnetic toner, for example, dispersing agents, surfactants and materials to promote dye and/or treating agent fixation in the substrate. Further examples of such chemical assistants include urea; latent oxidizing agents, such as sodium chlorate and sodium m-nitrobenzene sulfonate; latent reducing agents; acid or alkali donors, such as ammonium salts and sodium trichloroacetate; and dye carriers, usually present in amounts of 0.1 to 8% by weight based on the total toner weight, such as benzyl alcohol, benzanilide, β-naphthol, o-phenylphenol and butyl benzoate. Conventional commercial dispersing agents, such as the lignin sulfonates and salts of sulfonated naphthalene-formaldehyde condensates, can be employed. Such agents include "Polyfon," a sodium salt of sulfonated lignin; "Reax," the sodium salts of sulfonated lignin derivatives; "Marasperse," a partially desulfonated sodium lignosulfonate; "Lignosol," sulfonated lignin derivatives; "Blancol," "Blancol" N and "Tamol," the sodium salt of sulfonated naphthalene-formaldehyde condensates; and "Daxad" 11 KLS and "Daxad" 15, the polymerized potassium and sodium salts, respectively, of alkyl naphthalenesulfonic acid. Other known useful auxiliary chemicals can assist in the prevention of "bleeding" of a dye pattern by preventing the swelling or coagulation of the resin. Exemplary of such auxiliary chemicals are starch, starch derivatives, sodium alginate and locust bean flour and its derivatives. Cationic surfactants, such as quaternary ammonium compounds, reduce the static propensity of the toner particles for the image-bearing magnetic film. Lower toner pickup in background or non-image areas can be achieved by incorporating such surfactants into the toner. Dimethyldistearylammonium chloride has been found to be particularly useful for this purpose. Still other auxiliary chemicals which may be present in the toner include known additives for improving the brightness and tinctorial strength of the dyeing, for example, citric acid, which is commonly used with cationic dyes, and ammonium oxalate, which is commonly used with acid dyes.

A free-flow agent, usually present in an amount within the range 0.01 to 5% by weight, preferably 0.01 to 0.4% by weight, based on total toner weight, can be added to keep the individual toner particles from sticking together and to increase the bulk of the toner powder. This facilitates an even deposition of toner particles on the latent magnetic image. Free-flow or dispersing agents, such as microfine silica, alumina and fumed silica sold under the trade names "Quso" and "Cab-O-Sil," are useful.

The invention process and device are applicable to all types of printable substrates. Particularly preferred are fabric substrates, such as those prepared from natural and regenerated cellulose, cellulose derivatives, wool and synthetic fibers, such as polyamides, polyesters and polyacrylics, and mixtures of any of such fabrics. Film substrates, such as commercially available polyester film and paper, are also preferred.

The following discussion relates to process and equipment details of the invention. It is to be understood that any specific reference solely to color printing or to the printing of substrates with a chemical treating agent, or any specific reference to only certain aspects of either type of printing, is not intended to be limiting on the invention. Furthermore, the following references to and/or discussions of the accompanying drawings are intended to facilitate understanding of the invention rather than to impose limitations thereon. Based on the following discussion of process and equipment details, one skilled in the art will readily be able to envision other (undescribed) embodiments of the invention.

As already suggested, the invention is useful for producing multiple color prints (reproductions) of an original design. The invention has particular applicability to the formation of colored prints of an original design consisting of multiple colors. In such a system a plurality of toner decorated magnetic images corresponding to a series of color separation film positives of the original multicolored design are successively transferred to a substrate in register and superimposed one on top of the other so as to form a multicolored print composed of the different color images.

Either multicolor or full color separation film positives are prepared from the original design. Multicolor film separations (that is, one film separation for each color in a pattern) can be made either manually by tracing the design or by using a color recognition electronic scanner. The preparation of full color (that is, process color) separation film positives can be made either with a camera and colored filters or by using a process color electronic scanner. With the former technique, the original design is photographed through three filters, each corresponding in color and light transmission to one of the additive blue, green and red primaries. Placing a red filter over the camera lens produces a negative recording of all the red light reflected or transmitted from the original. This is known as the red separation negative. When a film positive is made from this negative, the silver in the film will corespond to areas which did not contain red but contained the other two colors of light, that is, blue and green. In effect, the ngative has subtracted the red light from the original design. The positive is a recording of the blue and green in the original design and is called the cyan film positive. Photographing through a green filter produces a negative recording of the green in the original design. The positive is a recording of the red and blue additive primaries and is called the magenta film positive. The use of a blue filter produces a negative which records all of the blue in the original design. The positive records the red and green which, when combined as additive colors, produce yellow. This is called the yellow film positive. For some designs, a black film positive is needed. This is obtained by photographing the original design through red, blue and green filters in succession. A detailed discussion of the preparation of process color film positives can be found in "Principles of Color Reproduction," J. A. C. Yule, Chapters 1 and 3, John Wiley and Sons, Inc., 1967.

Electronic scanners can be used for both full color (based on the four process colors) or multicolor (individual color recognition) film separations. In both types of scanners, the original design is mounted on a horizontally rotating drum which is driven by a step motor operating at approximately 2,000 steps per second. A horizontally moving scanning head is mounted in front of the drum. The design pattern is illuminated and the reflected colored light is intercepted by the scanning head at each step. A series of prisms and mirrors splits the reflected light into red, green and blue components which are then converted into three separate electronic signals. In full color separation scanners, the red, green and blue components are processed through an optical electronic converter which provides the yellow, magenta, cyan and black film separation positives. In multicolor separation scanners, the red, green and blue components are compared to the amounts of red, green and blue components stored in the scanners computer memory. The output is a film separation positive corresponding to each color pattern in the original design. As many as twelve different colors can be stored in the computer memory of a multicolor separation scanner. Suitable electronic color scanners are readily available commercially. Electronic scanners have obvious advantages over manual separation techniques due to their lower processing cost, higher speeds (2 to 3 hours as compared to 100 to 200 hours) and greater resolution capabilities.

The aforesaid color separation film positives are used to form a plurality of latent magnetic images, as described below, one latent magnetic image corresponding to each color film positive. Each latent magnetic image is then decorated with dye-containing ferromagnetic toner particles to form a series of toner-decorated latent magnetic images corresponding to the color separation images. In a typical subtractive multiple color processing system in accord with this invention, each latent magnetic image is decorated with toner particles having a dye color complementary to the original color separation filter. Thus, the cyan latent magnetic image corresponding to the red color filter is decorated with toner containing a blue dye; the yellow latent magnetic image corresponding to the blue filter is decorated with a yellow dye toner and the magenta latent magnetic image corresponding to the green color filter is decorated with a red dye toner. The dye images from each of the individual toner-decorated images are transferred to register and superimposed, one on top of the other, on the substrate to form the final multicolor print of the original printed design.

The most important force for magnetic printing is, of course, of magnetic origin. However, stray electrostatic forces can exceed magnetic forces. Since ferromagnetic toner particles are attracted by both electrostatic and magnetic fields, any high electrostatic charge density on the magnetic printing surface (that is, the ferromagnetic material) will generate fields equal to or greater than the magnetic field from the magnetic image. The background region, that is, the portion of the printing surface other than that containing the magnetic image, will thus attract enough toner particles to render the final print unattractive, if not indiscernible. Static charges usually build up at a sufficiently slow rate so that at least one clear print can be made, but unless some means is provided to dissipate the static charges, after a few prints have been made, the buildup of static charge becomes large enough to cause serious background problems.

In the invention process and device, the background problem can be eliminated in one of two ways. One requires use of an external charge dissipating means; for example, a series of AC (alternating current) neutralizing coronas can provide positive and negative ions to neutralize any electrostatic charge buildup on the printing surface. In this case, the ferromagnetic $CrO_2$ coating can be on a dielectric support. However, the preferred method of eliminating electrostatic charges is to continuously coat the semiconductive ferromagnetic $CrO_2$ plus binder on a conductive support, for example, as shown in FIG. 1. Additionally, two AC coronas can be employed in conjunction with the continuously $CrO_2$-coated conductive support to neutralize any residual charges on the toner.

Figure 10:
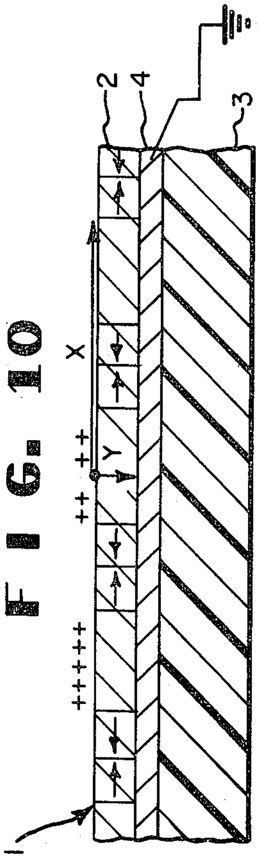
FIG. 10, representing a side view, in rectilinear form, of the printing member of FIG. 1, depicts the path of the electrostatic charge being dissipated from the acicular $CrO_2$ of layer 2 to ground through conductive layer 4.

Since the surface resistivity of the $CrO_2$ coating is approximately $10^8$ ohms/square, the time required for complete static charge dissipation must be less than the time elapsed between electrostatic toner transfer and subsequent toner redecoration; otherwise, static charge will build up on the printing surface. As can be seen from FIG. 10, using the conductive $CrO_2$-coated printing member 1 of this invention, the electrostatic surface charge on the $CrO_2$ 2 travels through the thickness of the $CrO_2$, that is, in the Y direction, instead of along the entire length of the $CrO_2$ surface, that is, in the X direction, in order to reach ground through the conductive support 4. Grounding is accomplished by clamping the $CrO_2$-coated printing member 1 to printing drum 12 depicted in FIG. 11. For a 5-inch wide printing surface, the X/Y ratio is approximately $10^4$ and, thus, rapid charge dissipation occurs and background free prints are obtained.

In one embodiment of the invention process, the electrically conductive support providing the path to ground for the electrostatic charge can be either continuously coated with a layer of ferromagnetic $CrO_2$ or can be provided with a series of grooves which are in turn filled with the $CrO_2$. Figure 1 shows an enlarged crossectional view of the continuously surface-coated conductive magnetic printing member 1 of this invention comprising a conductive support which is continuously coated with a 50 to 1,000 microinch (1.27 to 25.4 $\times 10^{-4}$ cm), preferably 100 to 500 microinch (2.54 to 12.7 $\times 10^{-4}$ cm), layer 2 of ferromagnetic $CrO_2$ in a resin binder. Acicular $CrO_2$ is particularly preferred due to its high coercivity, which allows it to be magnetically oriented to give a high remanence. A unique aspect of $CrO_2$ is its outstanding magnetic properties together with its easily attainable Curie temperature of 116° C. Acicular $CrO_2$ can be produced by techniques well known in the art. The conductive support can be any appropriate material, for example, a polyethylene terephthalate film 3, about 125 microns in thickness, coated with a thin conductive layer of aluminum 4. Commercially available aluminized polyester film is particularly useful as a conductive support. The conductive support can be a metallized plastic material, for example, a sleeve of a plastic material, such as an acetal resin, coated with aluminum, nickel, copper or other conductive metal, or it can be a metal sleeve coated with a thin layer of neoprene, or an epoxy resin, containing conductive particulate matter, for example, carbon black, graphite or silver, uniformly dispersed therein. The conductive support can also be the conductive metal itself.

The coating of the conductive support with acicular $CrO_2$ can be accomplished in a variety of ways, for example, by gravure coating a slurry of $CrO_2$ and resin in tetrahydrofuran-cyclohexanone on a web of aluminized polyester or by spray-coating a conductive metal sleeve. However, regardless of the coating technique used, it is desirable to orient the $CrO_2$ by passing the wet coated conductive support between the pole pieces of two bar magnets (approximately 1,500 gauss average field strength) aligned with the same poles facing one another. The magnetic flux lines orient the acicular $CrO_2$. FIGS. 2A and 2B show top and side views, respectively, of printing member 1 of FIG. 1 before orientation; FIGS. 2C and 2D show these respective views after orientation. Ratios of magnetic remanence to magnetic saturation ($B_r/B_S$) of up to 0.80 with an intrinsic coercivity ($iH_c$) of 510 to 550 oersteds have been obtained on such printing members.

Figure 3B:
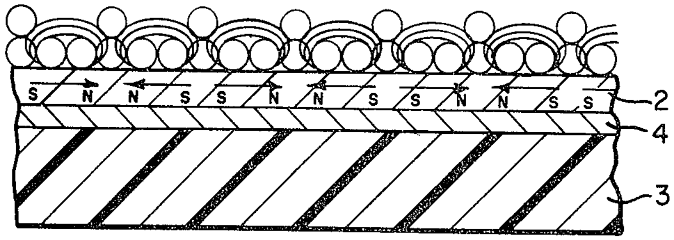
FIG. 3B represents the same view after the $CrO_2$ of layer 2 has been magnetically structured.

If the oriented $CrO_2$ magnetized printing surface is decorated with ferromagnetic toner particles (for example, 10 to 30 micro particles consisting of a dye and a ferromagnetic component encapsulated in a water-soluble resin binder), the particles will be magnetically attracted to only the edges of the surface as depicted in FIG. 3A. In order to achieve even toner decoration of the entire magnetic printing surface, the continuous $CrO_2$ coating is magnetically structured, as illustrated in FIG. 3B, so as to create magnetic flux gradients that uniformly attract the magnetic toner particles. A number of different techniques can be used to magnetically structure the magnetic printing surface. An alternating signal, equivalent to 100 to 1,500 magnetic lines per inch (39 to 590 lines per cm), can be recorded on the $CrO_2$ surface using a magnetic write head. A magnetic line consists of two magnetic flux reversals. Alternatively, a Ronchi ruled transparent film can be placed on top of the uniformly magnetized $CrO_2$ surface and the assembly can then be exposed to a Xenon flash passing through the transparent ruled film. The $CrO_2$ under the clear areas of the film is thermally demagnetized to provide the requisite magnetic pattern. The technique of roll-in magnetization also can be used to structure the $CrO_2$ surface. In this method, a high permeability material, such as nickel, which has been surface structured to the desired groove width is placed in contact with the unmagnetized $CrO_2$ surface. A permanent magnet or an electromagnet is placed on the backside of the highly permeable material. As the structured high permeability material is brought into contact with the $CrO_2$ surface, the magnet concentrates the magnetic flux lines at the points of contact, resulting in the magnetization of the $CrO_2$ coating. The $CrO_2$ surface can also be thermoremanently structured by placing the continuously coated $CrO_2$ surface on top of a magnetic master which has the desired magnetic line pattern recorded on it. Thermoremanent duplication of the master pattern on the $CrO_2$ surface is effected by heating the surface above the 116° C $CrO_2$ Curie temperature. As the surface cools down below the Curie temperature, it picks up the magnetic signal from the magnetic master and is selectively magnetized. In still another method, a scanning laser beam can be used to structure the magnetic $CrO_2$ surface.

Figure 4:
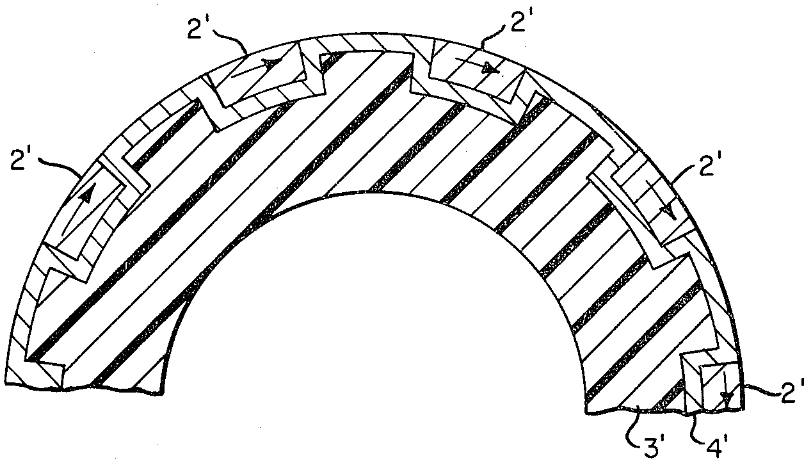
FIG. 4 represents an enlarged cross-sectional view of a cylindrical, intermittently surface-coated (in grooves) conductive magnetic printing member.

FIG. 4 shows an enlarged cross-sectional view of the permanently structured conductive magnetic printing member 1′ of this invention, comprising a grooved conductive support with the $CrO_2$ and resin binder 2′ in the grooves. In this embodiment, the conductive support is preferably a plastic support material 3′ which has been structured to the desired groove width and depth. The grooved plastic support 3′ is plated with a thin layer of a conductive metal 4′, such as aluminum, copper, nickel or the like, and the grooves are filled with the $CrO_2$ and resin binder 2′. If desired, the grooved support can consist solely of the conductive metal, for example, copper. As in the case of the continuously coated magnetic printing member illustrated in FIG. 1, the $CrO_2$ must be oriented during the groove filling operation. Magnetization of the grooved conductive magnetic printing surface can be readily accomplished by passing the surface in front of a magnetic field.

Figure 7:
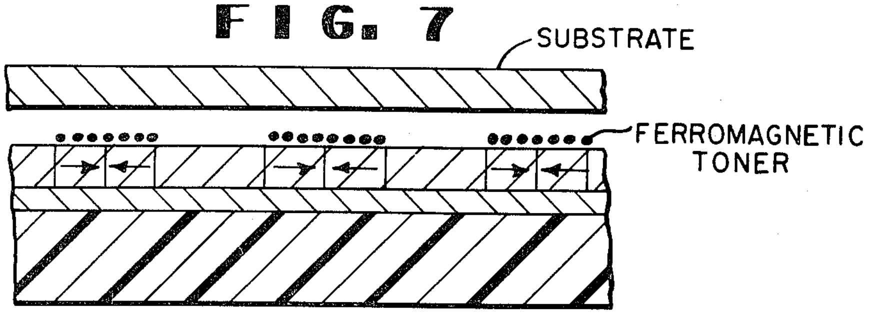
Figure 8:
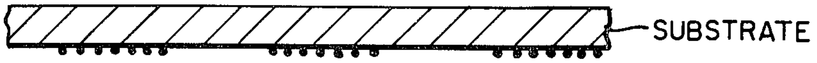
Figure 9:

Further aspects of the invention are depicted in FIGS. 5 to 9 (shown for simplification as comprising flat surfaces) which show the stepwise formation of the latent magnetic image on the structured printing member 1 (FIGS. 5 and 6), the decoration thereof with toner particles (FIG. 7), the transfer of the toner particles to the substrate (FIG. 8) and the toner particles adhered to the substrate (FIG. 9). The aforesaid sequence of steps can be carried out using the continosly $CrO_2$-coated magnetic printing member 1 depicted in FIG. 1, the $CrO_2$ surface of which has been oriented (depicted in FIG. 2) and magnetically structured (depicted in FIG. 3), FIGS. 2 and 3 shown for simplification as comprising flat surfaces. A similar sequence of steps can be envisaged for the grooved magnetic printing member depicted in FIG. 4.

It is to be understood, and it will be obvious to one skilled in the art, that the structured printing member can be imaged in such a way that the substrate will be uniformly chemically treated and/or dyed, depending on the type of ferromagnetic toner used, over a wide area. In other words, instead of a pattern-type print, the print can provide a total coloration and/or chemical treatment of the substrate.

Figure 5:
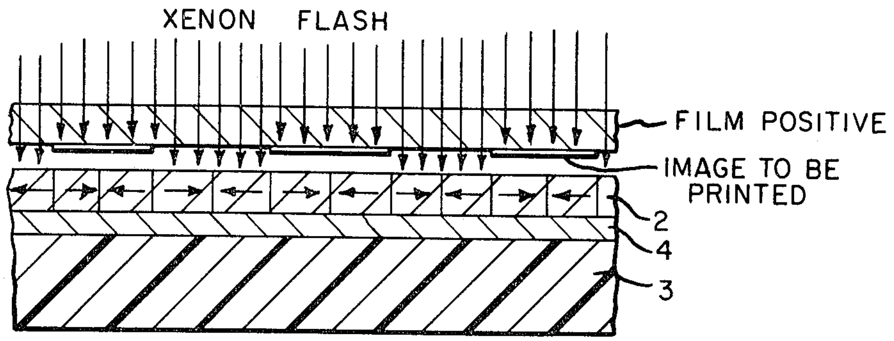
FIGS. 5 to 9 represent certain steps of the invention magnetic printing process as they apply to the use of the magnetically structured printing member represented by FIG. 3B.
Figure 6:
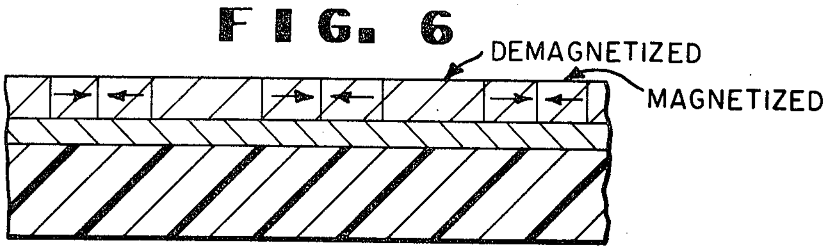

Referring further to FIG. 5, a latent magnetic image is formed on the surface of the magnetic printing member 1 by placing an image-bearing photocolor separation film positive, prepared as described above, in face-to-face contact with the structured printing surface and uniformly heating, from the backside of the film positive, with a short burst of high energy from a Xenon lamp. the dark areas of the film positive, that is, the image areas, absorb the energy of the Xenon flash, while the transparent areas of the film transmit the energy, thereby heating the $CrO_2$ to above the 116° C Curie point. As can be seen from FIG. 6, the surface of the magnetic printing member is selectively demagnetized to form a latent magnetic image which consists of a reproduction of the dark areas of the film positive.

Instead of using a photocolor separation film positive, an electronic color scanner can also be used to form the latent magnetic image. The output signal from the scanner drives a magnetic write head which is in contact with the surface of continuously $CrO_2$-coated printing member 1. There is no need to prestructure the printing surface since the data recording of the magnetic write head can provide the required magnetic flux lines to attract the toner particles. A permanent record of the latent magnetic image can be obtained by decorating the latent magnetic image with a black toner and transferring and fusing it onto a transparent film. The output of the scanner can also consist of digital color separation data recorded on a magnetic tape and this tape can be used to drive the magnetic write head directly on the printing surface.

Ferromagnetic toner particles are applied to the latent magnetic image to form a decorated magnetic image (as shown in FIg. 7) and the substrate to be printed is brought into juxtaposition therewith to effect transfer of the image to the substrate (FIG. 8).

The latent magnetic image can be developed by convenient methods which are well known in the art. Typical methods include cascade, magnetic brush, magnetic roll, powder cloud and dusting by hand. In cascade development, finely divided ferromagnetic toner particles are conveyed to and rolled or cascaded across the latent magnetic image-bearing surface, whereupon the ferromagnetic toner particles are magnetically attracted and secured to the magnetized portion of the latent image. In magnetic brush or roll development, ferromagnetic toner particles are carried by a magnet. The magnetic field of the magnet causes alignment of the magnetic toner particles into a brushlike arrangement. The magnetic brush or roll is then engaged with the magnetic image-bearing surface and the ferromagnetic toner particles are drawn from the brush to the latent image by magnetic attraction. The transfer of the ferromagnetic toner particles to the substrate can be accomplished either by pressure, magnetic or electrostatic means, or a combination thereof. In the preferred electrostatic means, a positive or negative charge is applied to the backside of the substrate which is in contact with the toner-decorated latent magnetic image. In connection with the use of pressure transfer means, the use of high force, for example, about 40 pounds per linear inch (about 7 kg per linear cm), generally results in shorter printing surface life, poorer transfer efficiency and poorer image definition on the substrate. Such problems are avoided by using electrostatic transfer means wherein there is no substantial amount of pressure between the printing surface and the substrate and, therefore, no abrasion occurs.

The transferred image is temporarily adhered to the substrate (as shown in FIG. 9) until permanent fixation of the dye and/or chemical treating agent thereon and/or therein is effected. Temporary adhering of the transferred image to the substrate conveniently can be effected by application of heat and/or water, the latter either in the form of an aqueous spray or as steam . Heating at 90° to 170° C and steam fusing at 100° C for 1 to 15 seconds at 760 mm of pressure are particularly preferred herein. The adhesion of the image to the substrate results from the melting and/or the partial dissolution (in the water) of the encapsulating resin. Final (permanent) fixation of the dye and/or chemical treating agent of the toner can be accomplished in any way which is consistent with the type of substrate and dye and/or agent which are used. For example, dry-heat treatment, for example, Thermosol treatment, at 190° to 230° C, particularly 200° to 210° C, for up to 100 seconds can be used to fix disperse dyes on polyester and mixed disperse-fiber reactive dyes on polyester-cotton. The application of pressure, for example, up to about 1.5 psig (0.11 kg per sq cm gauge), may be advantageous. High pressure steaming at pressures of 10 to 25 psig (0.7 to 1.8 kg per sq cm gauge) accelerates the fixation of disperse dyes on polyester and cellulose triacetate. Rapid disperse dye fixation can also be obtained by high-temperature steaming at 150° to 205° C for 4 to 8 minutes. High-temperature steaming combines the advantages of short treatment times without the need to use pressure seals. High molecular weight disperse dyes can be fixed to polyester-cotton using aqueous ethylene glycol- or polyethylene glycol-type solvents according to well known prior art procedures. Cottage-steaming and pressure-steaming can be used to fix cationic dyes to acid-modified acrylic and polyester fibers and to fix acid dyes, including premetalized dyes, to polyamide and wool fibers. Cottage-steaming uses saturated steam at a pressure of 1 to 7 psig (0.07 to 0.49 kg per sq cm gauge) and 100% relative humidity. It may be noted that there is no tendency to remove moisture from the fabric when saturated steam is used. As the fabric is initially contacted by the steam, a deposit of condensed water quickly forms on its cold surface. Such water serves various functions, such as swelling the fiber and activating the chemical treating agent and/or dye, thereby creating the conditions necessary for the diffusion of the dye and/or agent into the fiber. Rapid aging at 100° to 105° C for 15 to 45 minutes at 760 mm (of Hg) of pressure can be used to fix disperse dyes to cellulose acetate fibers and cationic dyes to acid-modified acrylic fibers. The aforesaid fixation procedures are all known in the art, for example, as described by Clarke in "An Introduction to Textile printing," Third Edition, 1971, pages 58 to 66.

Depending on the nature of the toner dye and/or chemical treating agent, it may be necessary or desirable to treat the fabric with known auxiliary agents, to achieve certain effects, before final (permanent) fixation of toner dye and/or chemical treating agent. For example, it may be necessary to impregnate the fabric with an aqueous solution of an acid or an alkali, such as citric acid, ammonium oxalate or sodium bicarbonate, or in some cases, a reducing agent for the dye. Alternatively, these auxiliary agents can be incorporated directly into the toner composition.

Afer permanent fixation of the dye and/or chemical treating agent, the printed fabric is aqueous scoured to remove the ferromagnetic component, encapsulating resin and any unfixed dye and/or chemical treating agent. Although the severity of the scouring treatment generally depends on the type of resin employed, with ferromagnetic toners containing water-soluble or water-solubilizable resins, only a few seconds immersion in a conventional aqueous scour, for example, an aqueous surfactant solution or aqueous alkali, at less than 90° C, is sufficient to dissolve away the resin and release the ferromagnetic material from the fabric surface. In the case of dye-containing toners, a well-defined colored print is obtained on the fabric. The transfer of the dye and/or chemical treating agent-containing ferromagnetic toner to the substrate and the temporary adhering thereof on the substrate can be carried out in a continuous operation, that is, in an immediately sequential manner. The final (permanent) fixation of the dye and/or chemical treating agent and aqueous scouring can be carried out separately in a later operation.

As already suggested above, the magnetic printing process of the invention involves a delicate balance of forces in that the areas of the magnetic printing surface which are to retain ferromagnetic toner particles, that is, the image areas, must magnetically attract toner particles, whereas the image-free areas of the printing surface must not. On the other hand, the force of magnetic attraction must not be so great as to prevent the substantially complete transfer of the toner from the printing surface to the substrate. The strength of the magnetic attraction between the toner particles and the printing surface depends on the physical properties of the printing surface, such as the coercivity ($iH_c$) and remanence ($B_r$) of the $CrO_2$ coating, the degree of orientation of the $CrO_2$ crystals ($B_r/B_s$), the thickness of the $CrO_2$ coating, the number of magnetic lines on the surface and the properties of the ferromagnetic toner particles, for example, their mangetic susceptiblity, shape and size. It has been found that optimum decoration, transfer and fusion properties are obtained using a $CrO_2$ coating having a thickness range of 50 to 1,000 microinches (1.27 to 25.4 $\times$ $10^{-4}$ cm), preferably 100 to 500 microinches (2.54 to 12.7 $\times$ $10^{-4}$ cm), a coercity of 200 to 600 oersteds, preferably 350 to 580 oersteds, and an orientation ($B_r/B_s$) of 0.4 to 0.9, preferably 0.6 to 0.9 . The surface of the printing member can be magnetically structed to 100 to 1,500 magnetic liners per inch (39 to 590 per cm), preferably 150 to 400 magnetic liner per inch (59 to 157 per cm).

Figure 11:
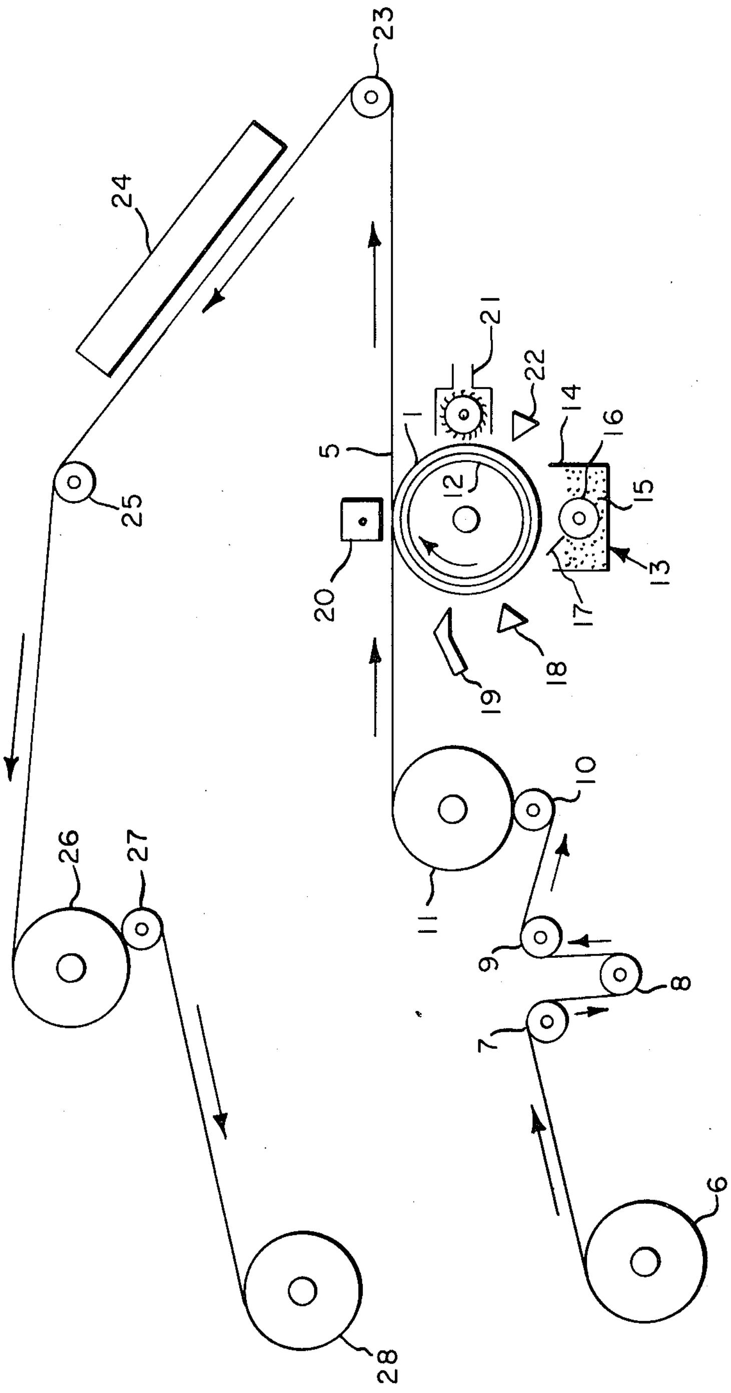
FIG. 11, in schematic form, depicts a single color magnetic printing device which can be used to carry out certain steps of the invention magnetic printing process.

Further to the above discussion, FIG. 11 shows a schematic diagram of a single color magnetic printing device which is useful in performing the invention magnetic printing process. The substrate 5 to be printed is fed from feed roll 6, around dancer rolls 7, 8 and 9 to the nip between feed rolls 10 and 11, which rolls cooperate to feed the substrate into physical contact with the surface of magnetic printing member 1, shown in cross-sectional view in FIG. 1. Magnetic printing member 1 can be a continuously $CrO_2$-coated aluminized polyester film which is secured and grounded to the outer circumferential surface of a rotating aluminum or copper printing drum 12. Prior to mounting printing drum 12 in the apparatus, the $CrO_2$ surface of the aluminized polyester film affixed thereto is magnetically structured, using a magnetic write head as previously described, into a line pattern containing 300 magnetic lines per inch (118 magnetic lines per cm). After structuring the printing surface, a latent magnetic image is formed thereon by placing a photocolor-separated film positive of a design in face-to-face contact with the magnetically structured printing surface on drum 12 and then uniformly heating the printing surface with successive short bursts from a high energy Xenon lamp flashed through the film positive. After exposure, the $CrO_2$ printing surface on drum 12 contains magnetized areas of $CrO_2$ corresponding to the printed areas of the film positive. Printing drum 12 is then mounted in the apparatus and is driven in the direction shown by the arrow by a commerically available drive motor (not shown) which is provided with a speed control unit. The printing member containing the latent magnetic image is then decorated (developed) with toner using a suitable decorating means 13. In the particular embodiment illustrated, the decorating means 13 is a magnetic brush decorating means comprising a trough 14 containing a supply of the toner particles 15. The toner particles are magnetically attracted to the surface of the magnetic brush 16 and are conveyed to the surface of printing member 1 where they are stripped from the surface of magnetic brush 16 by a stationary doctor blade 17. Toner particles are drawn from the brush to the latent magnetic image by magnetic attraction; surplus toner falls back into trough 14 for recirculation. Although this represents a convenient means for depositing toner on the printing memeber, any of the numerous decorating means known to those skilled in the art can be used. Triboelectric charges generated in toner trough 14 are eliminated by neutralization using AC corona 18. Any toner particles adventitiously adhering to the demagnetized areas of the $CrO_2$ surface are removed by vacuum knife 19. The printing member, bearing the clean decorated image, is then contacted with substrate 5 past DC corona discharge device 20, thus causing the toner particles to be transferred to substrate 5 upon its separation from printing member 1. A negative DC corona discharge device potential of 1 to 20 kilovolts, preferably 4 to 8 kilovolts, is used. There is only an insignificant amount of pressure between substrate 5 and the surface of printing member 1, which pressure is generated entirely by the electrostatic charge on substrate 5. Alternatively, transfer of the image can take place in the nip between a resilient pressure roll (not shown) and printing member 1, in which case the pressure roll replaces the corona discharge device 20. Applied pressure against the drum can range from 10 to 40 pounds per linear inch (1.8 to 7.1 kg per linear cm). However, the most efficient transfer, about 90 percent of the toner particles are transferred, occurs at the upper limit of this range. Such high pressures, however, have a destructive effect on the life of the printing member; hence, lower pressures are preferred if printing member life is a concern. Following transfer of the image, the substrate 5 containing the toner image particles is conveyed around idler roller 23 to thermal fusing means 24 which temporarily adheres the toner particles to substrate 5. The fusing means can be a bank of infrared heaters, a contact hot roll or a steam fuser. The substrate 5 is then conveyed over idler roll 25 to the nip between rolls 26 and 27 which cooperate to feed substrate 5 onto final take-up roll 28. After transfer, toner particles remaining on the surface of magnetic printing member 1 are removed by means of vacuum brush 21. Residual electrostatic charges are neutralized by AC neutralizing corona 22. The clean electrostatic charge-free surface of printing member 1 is then again decorated with toner in trough 14 and the neutralizing, vacuum knife cleaning, electrostatic transferring, fusing, vacuum brush cleaning and neutralizing steps are continued until the printing cycle is completed.

The aforesaid apparatus and description form the basis for a commercial single-color magnetic printer, for example, capable of printing speeds of up to 240 feet (73 meters) per minute, having the ability to provide multiple prints from a single latent magnetic image.

Figure 12:
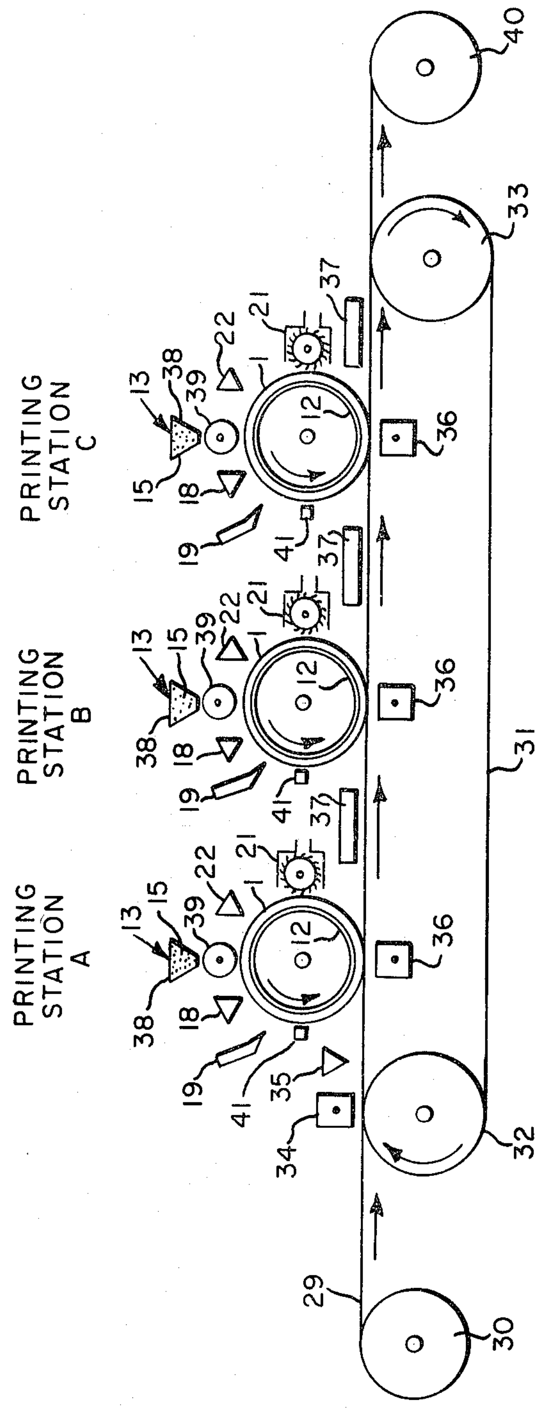
FIG. 12, in schematic form, depicts a three color magnetic printing device which can be used to carry out certain steps of the invention magnetic printing process.

As mentioned above, the invention magnetic printing process and device have particular applicability to the printing of colored prints of an original design composed of multiple colors. FIG. 12 shows a schematic view of a multicolor (three color) magnetic printing device embodiment of this invention. The substrate 29 to be printed is fed from feed roll 30 into contact with endless belt 31 which is made of a dielectric film, such as polyethylene terephthalate. Rollers 32 and 33 serve to drive, in the direction shown by the arrows, and guide endless belt 31. The substrate 29 is electrostatically attracted to endless belt 31 by means of DC (direct current) corona discharge device 34. Any electrostatic charge buildup on substrate 29 is neutralized by AC (alternating current) neutralizing corona 35. The charge-free substrate is conveyed by endless belt 31 to the toner-decorated surface of magnetic printing member 1 positioned at printing station A. The ferromagnetic toner is electrostatically transferred from the surface of this printing member 1 to substrate 29 by means of DC corona discharge device 36. After transfer, the toner is fused to substrate 29 using fusing means 37 which is an infrared or steam fusing device. The process of applying toner to the surface of magnetic printing member 1 is essentially the same as shown in FIG. 11 for the single color magnetic printer.

As further shown at station A in FIG. 12, a latent magnetic image of one of the colors (yellow, cyan or magenta) making up the design to be printed is formed on the surface of the magnetic printing member 1 mounted on drum 12. The latent magnetic image is decorated with ferromagnetic toner particles 15 using a suitable decorating means 13. In the particular embodiment illustrated, decorating means 13 consists of hopper 38 having a narrow orifice from which toner particles 15 are smoothly and uniformly dispensed onto the surface of magnetized roll 39. The toner particles adhering to magnetic roll 39 are subsequently driven by magnetic attraction from the roll to the latent magnetic image on the surface of printing member 1. The surface of toner decorated printing member 1 is neutralized with AC neutralizing corona 18 and vacuum cleaned with vacuum knife 19 to remove toner particles which have adventitiously become attracted to the demagnetized background area. After transfer of the toner to substrate 29 using DC corona 36, the surface of printing member 1 is vacuum cleaned with vacuum brush 21 and the residual electrostatic charges are neutralized using AC corona 22. The clean, electrostatic charge-free printing surface is then ready for redecoration followed by the steps of neutralization, vacuum knife cleaning, electrostatic transfer, fusion, vacuum brush cleaning and neutralization. This sequence of steps is continued until the printing cycle is completed.

Latent magnetic images of the remaining two colors making up the design to be printed in this embodiment are similarly decorated, transferred and fused at printing stations B and C. The fused multicolor printed fabric is taken up by take up roll 40. The image alignment of printing stations A, B and C is achieved electronically by placing a magnetic read head 41, commonly available, at the edge of each printing drum 12. The read head 41 senses the signal on the magnetic surface that is in registry with the image at each printing station. This signal is sent to a synchronization control box (not shown). The speed of endless belt 31 is set manually by a belt drive motor (not shown). A belt speed signal is sent to the synchronization control box which controls the speeds of each of the motors driving the drums at printing stations A, B and C. Thus, all of the drums are placed in register by means of the feedback signal from the magnetic read head 41 on each of the drums.

It is to be understood that the aforesaid discussions of figures are devoid of descriptions of the permanent fixation (of dye and/or chemical treating agent) and the ferromagnetic component- and resin-removal (for example, by aqueous scouring) steps of the invention magnetic printing process since these steps, and the equipment which can be employed in connection therewith, are familiar to one skilled in the art of dye chemistry.

In addition to direct fabric printing, the invention process also affords the capability of indirectly printing fabrics by utilizing the process in combination with heat-transfer printing. In magnetic/heat-transfer printing, ferromagnetic toners containing sublimable dyes are first directly printed to a paper substrate, fused thereon as described above and then subsequently heat-transfer printed from the paper substrate to a fabric substrate employing a combination of heat, pressure and dwell time. Heat-transfer printing at 160° to 250° C, preferably 190° to 220° C, at 1 to 2 psi (0.07 to 0.14 kg per sq cm) pressure for up to 100 seconds dwell time provides good results in the invention magnetic/heat-transfer printing process. Under such conditions, the dye sublimes and is transferred to and is fixed within the fabric substrate. The resin and ferromagnetic components are subsequently removed by scouring the printed fabric substrate as described above for the magnetic printing process.

The invention magnetic printing process provides numerous advantages over conventional wet printing processes. For example, prints can be produced having half-tone or large solid areas which exhibit excellent optical density. Since the printing surface is reusable, there is no need for conventional printing screens and rollers. A dry toner system is used and no print paste makeup is required. This provides minimum water pollution (by dye) on cleanup. No additional auxiliary chemicals or gums are required since the ferromagnetic toners can be formulated so as to contain all of the necessary materials. Moreover, lower printing costs are obtainable due to lower engraving costs and shorter changeover times.

EXAMPLES

In the following examples, unless otherwise noted, all parts and percentages are by weight and all materials employed are readily commercially available.

EXAMPLE 1

This example illustrates the preparation, by manual mixing of the ingredients followed by spray-drying, of a ferromagnetic toner containing a blue disperse dye, magnetic components and an aqueous alkali-soluble resin, and the application thereof to both paper and polyester. A magnetic toner was prepared from 32.7% of carbonyl iron, 32.7% of $Fe_3O_4$, 1.8% of C.I. Disperse Blue 56, 5.5% of ligninsulfonate dispersant and 27.3% of a polyvinyl acetate copolymer resin. The carbonyl iron, used as the soft magnetic material and commercially available under the trade name "Carbonyl Iron" GS-6, is substantially pure iron powder produced by the pyrolysis of iron carbonyl. A suitable $Fe_3O_4$ is sold under the trade name "Mapico" Black Iron Oxide and the polyvinyl acetate copolymer resin, under the trade name "Gelva" C5-VIOM. "Gelva" C5-VIOM is an aqueous alkali-soluble copolymer of vinyl acetate and a monomer containing the requisite number of carboxy groups and has a softening point of 123° C.

A 20% aqueous alkaline solution (450 parts) of the polyvinyl acetate copolymer resin was manually stirred with 500 parts of water until thorough mixing was effected. Carbonyl Iron GS-6 (108 parts) and "Mapico" Black Iron Oxide (108 parts) were added and the mixture was thoroughly stirred. C.I. Disperse Blue 56 (24 parts of a 24.6% standardized powder) was stirred in 455 parts of water until completely dispersed, then added to the above resin solution. The resultant toner slurry was stirred for 30 minutes with a high shear mixer and then spray-dried in a Niro electric spray-dryer. The toner slurry was atomized by dropping it onto a disc rotating at 20,000 to 50,000 rpm in a chamber through which heated air was swirling at a high velocity. Precautions were taken to stir the toner slurry and maintain a uniform feed composition. The exact temperature and air velocity depend mainly on the softening point of the resin. An air inlet temperature of 225° C, an outlet temperature of 85° C and an atomizer air pressure of 85 psig (16 kg per sq cm gauge) provided satisfactory results. The resulting discrete toner particles of magnetic resin-encapsulated dye had a particle size within the range of 2 to 100 microns, mostly within the range of 10 to 25 microns. The particles were collected in a collection chamber. Toner adhering to the sides of the drying chamber was removed by brushing into a bottle and combined with the initial fraction. The toner sample was finally passed through a 200 mesh screen (U.S. Sieve Series), thus being less than 74 microns in particle size. The ferromagnetic toner was mechanically mixed with 0.2% of a fumed silicate, Quso WR-82, to improve powder flow characteristics.

Toner evaluation was made on a 2 mil (0.0508 mm) aluminized "Mylar" polyester film continuously coated with 170 microinches (43,180 Å) of acicular $CrO_2$ in a resin binder. Suitable acicular $CrO_2$ can be prepared by well known prior art techniques. The $CrO_2$ film was magnetically structured to 300 lines per inch (12 lines per mm) by recording a sine wave with a magnetic write head. A film positive of the printed image to be copied was placed in contact with the magnetically structured $CrO_2$-coated aluminized polyester film and uniformly illuminated by a Xenon flash passing through the film positive. The dark areas of the film positive corresponding to the printed message absorbed the energy of the Xenon flash, whereas the clear areas transmitted the light and heated the $CrO_2$ beyond its 116° C Curie point, thereby demagnetizing the exposed magnetic $CrO_2$ lines. The latent magnetic image was manually decorated by pouring the fluidized toner powder over the partially demagnetized $CrO_2$ film and then blowing off the excess. The magnetic image became visible by virtue of the toner being magnetically attracted to the magnetized areas.

The toner decorated image was separately transferred to paper and to polyester fabric substrates by applying a 20 kv positive potential from the backside of the substrate by means of a DC corona. Other transfer means can also be employed, such as by means of a pressure of 10–40 pounds per linear inch (1.8–7.1 kg per linear cm). However, such means may lead to shorter film life, poorer transfer efficiency and poorer image definition on the substrate. After transfer to the paper or fabric substrate, the toner was fused thereon by infrared radiation, backside fusion (140° C) or by steam fusion (100° C for 10–15 seconds at 1 atm pressure). The latter method is the most economical but is only possible with water-soluble resins.

The image which had been transferred to the paper was then heat transfer printed from the paper to polyester fabric by placing the fused image-bearing paper face-down on the polyester and applying 1.5 to 2.0 psi (0.11 to 0.14 kg per sq cm) pressure for 30 seconds at 205–210° C. After direct transfer and fusion to polyester fabric, the dye was fixed in the fabric by heating for 30 seconds at 205°–210° C and 1.5 to 2.0 psi pressure (0.11 to 0.14 kg per sq cm).

Both fabric samples which had been printed as described above, that is, either directly printed or heat transfer printed from paper, following fixation of the dye, were scoured by immersion in cold water and then in hot detergent. A detergent consisting of sodium phosphates, sodium carbonates and biodegradable anionic and nonionic surfactants ("Lakeseal") was used. The samples were finally rinsed in cold water and dried. A deep blue print was obtained on each fabric.

EXAMPLE 2

This example illustrates the preparation, by ball-milling of the ingredients followed by spray-drying, of a ferromagnetic toner containing a blue disperse dye, magnetic components and an aqueous alkali-soluble resin, and the application thereof to polyester. A magnetic toner was prepared from 30% of carbonyl iron, 30% of $Fe_3O_4$, 10% of C.I. Disperse Blue 56 and 30% of a polyvinyl acetate copolymer resin ("Gelva" C5-VIOM).

A mixture of 300 parts of a 20% aqueous alkaline solution of the polyvinyl acetate copolymer resin, 20 parts of C.I. Disperse Blue 56 crude powder, 60 parts of "Mapico" Black Iron Oxide, 60 parts of Carbonyl Iron GS-6 and 100 parts of water was ball-milled for 17 hours at 37% nonvolatiles. A ceramic ball-mill was selected of such size that when the ball-mill was about one-half to two-thirds full of 0.5 inch (1.27 cm) high density ceramic balls, the above ingredients just covered the balls. After discharging the ball-mill and diluting with 460 parts of water to reduce the total nonvolatile solids to approximately 20%, the slurry was spray-dried in a Niro spray-dryer using an air inlet temperature of 200° C, an air outlet temperature of 80° C and an atomizer air pressure of 80 psig (5.6 kg per sq cm gauge). The toner particles were brushed from the drying chamber, collected and passed through a 200 mesh screen. The toner sample was fluidized with 0.2% of Quso WR-82 and then used to decorate the latent magnetic image on a 300 line per inch (12 per mm) $CrO_2$-coated aluminized "Mylar" film as described in Example 1. The toner decorated image was electrostatically transferred directly to 100% polyester double-knit fabric by applying a 20 KV negative potential to the backside of the fabric. The toner was steam fused to the fabric at 100° C for 10–15 seconds at 1 atm pressure. After fusion, the dye was fixed in the fabric by heating at 205° C for 40 seconds at 1.5 psi (0.11 kg per sq cm). The printed fabric was then scoured at 65° C in a mixture of 2 parts per liter of caustic soda, 2 parts per liter of sodium hydrosulfite and 2 parts per liter of a polyoxyethylated tridecanol surface-active agent to remove resin, Fe, $Fe_3O_4$ and any unfixed dye and then dried. A bright blue print was obtained.

EXAMPLE 3

This example illustrates the preparation of a solvent ball-milled and spray-dried, ferromagnetic resin encapsulated, disperse dye toner and the application thereof to polyester.

A magnetic toner was prepared by ball-milling a mixture of 120 parts of an aqueous alkali-soluble polyamide resin-dicarboxylic acid adduct (commercially available as TPX-1002), 136 parts of "Mapico" Black Iron Oxide, 136 parts of Carbonyl Iron GS-6, 8 parts of C.I. Disperse Red 60 crude powder and 267 parts of a 50:50 mixture of toluene:isopropanol for 16 hours at 60% nonvolatile solids. The ball-mill was discharged and the contents was diluted with 666 ml of a 50:50 mixture of toluene:isopropanol to approximately 30% nonvolatile solids. The solvent toner slurry was spray-dried in a Bowen spray-dryer using a feed rate of 152 ml per minute, an air inlet temperature of 143° C, an air outlet temperature of 62° C and an atomizer air pressure of 85 psig (6 kg per sq cm gauge). The toner particles were classified to some extent by a cyclone collection system. The main toner fraction (81%, 238 parts) collected from the dryer chamber consisted of nearly spherical spray-dried particles having an average particle size of 10 to 15 microns (a range of 2 to 50 microns). The resultant magnetic toner consisted of 30% of polyamide resin adduct, 34% of carbonyl iron, 34% of $Fe_3O_4$ and 2% of C.I. Disperse Red 60. The toner was fluidized with 0.3% of Quso WR-82 and then applied to decorate the latent image on a 300 line per inch (12 per mm) magnetically structured $CrO_2$ coated aluminized "Mylar" film as described in Example 1. The toner decorated image was electrostatically transferred directly to 100% polyester woven fabric by applying a 20 KV negative potential to the backside of the fabric. The fabric was steam fused and the dye was fixed by heating at 205° C for 40 seconds at 1.5 psi (0.11 kg per sq cm). The printed fabric was then scoured as in Example 2 and dried.

EXAMPLES 4 to 33

Disperse dye toners were prepared by either manually mixing or ball-milling the appropriate ingredients and spray-drying the slurry as described in Examples 1 and 2. Details are summarized in Table I. Manually mixed toners were prepared in all cases except Examples 13, 14, 19 and 32; in these the toners were prepared by ball-milling. The compositions of the final spray-dried toners as well as the ratio of resin to total magnetic component present are also shown in the table. Ball-milled toners exhibited optical densities, when printed on polyester, which were superior to those of manually mixed toners of comparable dye concentration. This difference is particularly evident when the toner contains high concentrations of dye. The standardized disperse dye powders (and pastes) used in the manually mixed toners contained ligninsulfonate and sulfonated naphthalene-formaldehyde condensate dispersing agents. At high dispersant levels, the quantity of magnetic component in the toner becomes limited and decoration of the latent magnetic image may become impaired.

Toner compositions containing 9 to 74% (Examples 12 and 25) of water-soluble resin and 14 to 83% (Examples 11 and 12) of total magnetic component and compositions having a resin to magnetic component ratio of 0.11 to 3.3 (Examples 12 and 25) exhibited satisfactory magnetic, transfer and fusion properties. Various disperse dye types, for example, quinophthalone (Example 4), anthraquinone (Examples 5 to 25, 32 and 33) and azo (Examples 26 to 31) dyes, provide a wide range of colored magnetic toners. The amount of dye present in the toner depends on the amount of resin and magnetic component present. Dye concentrations of 0.10% (Example 33) to 25% (Example 32) were used with satisfactory results. Toner compositions containing both hard and soft magnetic components are exemplified in Table I. A binary mixture of magnetic particles is not essential, however. Equally good results are obtained using only a hard magnetic component (Examples 18 to 21). Ferric oxide is a preferred hard magnetic component based on its magnetic properties and its cost. Chromium dioxide can also be used but it is much more expensive. A free-flow agent, present in quantities of 0.01 to 5% (preferably 0.01 to 0.4%), based on total toner weight, was used to keep the individual toner particles from sticking together and to increase the bulk of the toner powder. These factors facilitate even deposition of toner over the imaging member. Free-flow agents such as micro-fine silica and alumina are useful. Quso WR-82 provides satisfactory flow properties when added to the toners described herein.

The toners were evaluated as described in Example 1. The latent magnetic image on a 300 line per inch (12 per mm) magnetically structured $CrO_2$ coated aluminized "Mylar" film was manually decorated and the decorated image ws electrostatically transferred to (that is, printed on) a substrate (shown in Table I). The toner fusion and dye fixation conditions and the scouring procedure for removing resin, magnetic component(s) and unfixed dye from the printed substrate are also given in the table. For instance, in Example 4 the designation "DP(Pap)[n]" indicates that the toner was directly printed on paper and infrared fused at 160°-170° C; the designation "HTP(PE)[f,g]" means that the toner was heat transfer printed from paper to polyester by heating at 205° C for 40 seconds and 1.5 psi (0.11 kg per sq cm) and the printed polyester was scoured at 65° C in aqueous detergent solution; and the designation "DP(PE)[i,f,g]" means that the toner was directly printed on polyester, infrared fused at 160°-170° C, the dye was fixed at 205° C for 40 seconds and 1.5 psi (0.11 kg per sq cm) and the printed polyester fabric was scoured at 65° C. in aqueous detergent.

A number of different fixation procedures, for example, dry heat, hot air, high temperature steam and high pressure steam, were used to fix the dyes in the substrate. Such procedures are well-known in the art for fixing disperse dyes in polyester and nylon.

Examples 27, 29, 30 and 31 show the effect of incorporating 2, 4, 6 and 8% of a benzanilide dye carrier. in the toner compositions. The carrier gave increased tinctorial strength over tone without the carrier. Concentrations of 2 to 4% (of carrier) provided optimum results.

EXAMPLE 34

This example illustrates the effect of various chemicals which are normally used in the conventional printing of polyester to prevent side effects during fixation of the dye.

The toner of Example 27 containing 2% of benzanilide carrier was directly printed on 100% polyester woven fabric according to the procedure of Example 1. The toner was steam fused at 100° C and 1 atm pressure for 10-15 seconds. The fabric was sprayed with a solution of 100 parts of urea and 10 parts of sodium chlorate in 1,000 parts of water to prevent reduction of the dye during the fixation step. The dye was fixed by high pressure steaming at 22 psig (1.55 kg per sq cm gauge) for 1 hour. The printed fabric was scoured in 2 parts per liter of sodium hydrosulfite, 2 parts per liter of soda caustic and 2 parts per liter of a polyethoxylated tridecanol surfactant at 65° C. A deep red print was obtained; it exhibited superior tinctorial strength as compared to a corresponding print which had not been sprayed prior to fixation.

EXAMPLE 35

This example illustrates the effect of various chemicals which are normally used in the conventional printing of nylon to prevent side effects during fixation of the dye.

The toner of Example 27 containing 2% of benzanilide carrier was directly printed on "Qiana" nylon fabric according to the procedure of Example 1. The toner was steam fused at 100° C and 1 atm pressure for 10-15 seconds. The fabric was then sprayed with a solution of 100 parts of urea, 10 parts of sodium chlorate and 10 parts of citric acid in 1,000 parts of water and the dye was fixed by high pressure steaming at 22 psig (1.55 kg per sq cm gauge) for 1 hour. After scouring, a deep red print was obtained; it was tinctorially stronger than a corresponding red print which had not been sprayed prior to fixation.

EXAMPLE 36

This example illustrates the preparation and application of a ferromagnetic disperse dye toner to a polyester/cotton blend fabric.

A 6-inch (15 cm) wide, 3-yard (274 cm) length of 65/35 polyester/cotton blend fabric was pretreated by padding to about 55% pickup with an aqueous solution containing 120 parts per liter of methoxypolyethylene glycol, M.W. 350. The padded fabric was heated at 72° C for 1 hour in a hot air oven to evaporate water, leaving the cotton fibers in a swollen state.

A magnetic toner was prepared by spray-drying a mixture containing 29.4% of polyvinyl acetate copolymer resin ("Gelva" C5-VIOM), 33.3% of Carbonyl Iron GS-6, 33.3% of "Mapico" Black Iron Oxide, 2% of a dye of the formula shown as (A) in Table VII and 2% of a sulfonated naphthalene-formaldehyde dispersant. The spray-dried product was sieved through a 200 mesh screen and 0.2% of Quso WR-82 was added to render the toner free flowing.

A latent magnetic image such as described in Example 1 was manually decorated with the above toner and transferred electrostatically to both untreated and pretreated 65/35 polyester/cotton by a procedure such as described in Example 1. Following transfer, the toner was steam fused at 100° C and 1 'atm pressure for 10 to 15 seconds and the dye was hot air fixed at 205° C for 100 seconds. Following fixation of the dye, the print was scoured at 65° C in aqueous detergent. The pretreated polyester/cotton fabric was printed in a deep bright red shade, whereas the untreated fabric was only lightly stained. Similar results were obtained when the disperse dye toner was transferred to the pretreated and untreated fabrics, steam fused and then dry heat fixed at 205° C for 100 seconds at 1.5 psig (0.11 kg per sq cm gauge).

EXAMPLE 37

This example illustrates the preparation of a ferromagnetic toner containing a cationic dye, magnetic components and an aqueous alkali-soluble resin and the application thereof to acid-modified polyester and polyacrylonitrile.

A solution of 21 parts of C.I. Basic Blue 77, as a 24.4% standardized powder (containing boric acid as a diluent) in 300 ml of hot water, was added, with thorough stirring, to 400 parts of a 20% aqueous alkaline solution of a polyvinyl acetate resin ("Gelva" C5-VIOM). Carbonyl Iron GS-6 (91 parts), "Mapico" Black Iron Oxide (91 parts) and 510 parts of water were then added and stirring was continued for an additional 30 minutes. The toner slurry was spray-dried to give a final toner composition containing 28.3% of polyvinyl acetate copolymer resin, 32.2% of Carbonyl Iron GS-6, 32.2% of "Mapico" Black Iron Oxide, 1.8% of C.I. Basic Blue 77 and 5.5 weight percent of boric acid diluent. The toner was sieved through a 200 mesh screen and fluidized with 0.2% of Quso WR-82.

A latent magnetic image such as described in Example 1 was manually decorated with the above toner and transferred electrostatically to acid-modified polyester fabric as described in Example 1. After transfer, the toner was steam fused at 100° C and 1 atm pressure for 10 to 15 seconds and the cationic dye was fixed by high-pressure steaming at 22 psig (1.55 kg per sq cm gauge) for 1 hour. The printed fabric was scoured as described in Example 2. A blue print was obtained.

A second toner transfer was made to polyacrylonitrile fabric in a similar manner. The toner was steam fused, the dye was fixed by cottage-steaming at 7 psig (0.5 kg per sq cm gauge) for 1 hour and the printed fabric was scoured as described above; a deep blue print was obtained.

In conventional printing with cationic dyes, a "steady acid" is normally used in the print paste to insure that an acid pH is maintained during fixation of the dye. Accordingly, in another set of experiments, after transfer and steam fusion of the above cationic dye toner to both the acid-modified polyester and the polyacrylonitirle fabrics, the printed fabrics were oversprayed with a 50% aqueous solution of citric acid and then fixed by high-pressure steaming and cottage-steaming, respectively, as described above. The printed fabrics were then scoured. Bright blue prints were obtained, exhibiting superior image definition as compared to the prints which were prepared without the overspray step.

EXAMPLES 38 to 43

Ferromagnetic cationic dye toners were prepared by manually mixing the appropriate ingredients and spray-drying the slurries as described in Example 37. After drying, 0.2 to 1.2% of Quso WR-82 was added to obtain toner fluidity. Details are summarized in Table II. The ferromagnetic cationic dye toners were directly printed to both acid-modified polyester and polyacrylonitrile substrates, steam fused and fixed by either high pressure steam development at 22 psig (1.55 kg per sq cm gauge) for 1 hour or by cottage-steaming at 7 psig (0.5 kg per sq cm gauge) for 1 hour.

Cationic dyes of the triarylmethane (Example 37), azomethine (Example 38), styryl (Examples 39 and 41–43) and rhodamine (Example 40) series, with both water-soluble hydroxypropyl cellulose ("Klucel" LF) and polyvinyl acetate copolymer ("Gelva" C5-VIOM) resins, are exemplified. "Klucel" LF is a cellulose ether containing propylene glycol groups attached by an ether linkage and not more than 4.6 hydroxypropyl groups per anhydroglucose unit and having a molecular weight of approximately 100,000. The cationic dye toners of Examples 42 and 43 containing 1 and 2%, respectively, of citric acid provided brighter and tinctorially stronger prints on both acid-modified polyester and polyacrylonitrile as compared to the corresponding toners without the citric acid.

EXAMPLE 44

This example illustrates the preparation of a ferromagnetic toner containing an acid dye, magnetic components and an aqueous alkali-soluble resin and the application thereof to nylon.

A solution of 12.7 parts of C.I. Acid Blue 40 (C.I. 62,125), as a 31.6% standardized powder (containing dextrin as a diluent) in 150 ml of hot water, was added, with thorough stirring, to 300 parts of a 20% aqueous alkaline solution of a polyamide resin (TPX-1002). Carbonyl Iron GS-6 (63.4 parts), "Mapico" Black Iron Oxide (64 parts) and 410 parts of water were added and the slurry was stirred on a high shear mixer for 20 minutes. The toner slurry was spray-dried to give a final toner composition containing 30% of polyamide resin, 31.7% of Carbonyl Iron GS-6, 32% of "Mapico" Black Iron Oxide, 2% of C.I. Acid Blue 40 and 4.3% of dextrin diluent. The toner was sieved through a 200 mesh screen and fluidized with 0.6 % of Quso WR-82.

A latent magnetic image such as described in Example 1 was manually decorated with the above toner and transferred electrostatically to 100% nylon 66 jersey fabric and steam fused at 100° C and 1 atm pressure for 10 to 15 seconds. The acid dye was fixed by cottage-steaming the printed fabric at 7 psig (0.5 kg per sq cm gauge) for 1 hour. The fabric was scoured at 60° C with an aqueous solution of 2 parts per liter of a polyethoxylated oleyl alcohol and 2 parts per liter of alkyl trimethylammonium bromide surface-active agents. A bright blue print was obtained.

EXAMPLES 45 to 53

Ferromagnetic acid dye toners were prepared by manually mixing the appropriate ingredients and spray-drying the slurries as described in Example 44. The toners were fluidized with 0.2 to 1.4% of Quso WR-82. Details are summarized in Table III. A latent magnetic image such as described in Example 1 was manually decorated and the toner decorated image was electrostatically transferred directly to nylon 66 jersey. The toners were steam fused and the acid dyes were fixed by cottage-steaming at 7 psig (0.5 kg per sq cm gauge) for 1 hour. After scouring, bright well-defined prints were obtained.

Toners containing monosulfonated azo (Examples 45, 46 and 51) and monosulfonated anthraquinone (Examples 47 to 50) dyes, with water-soluble polyvinyl acetate copolymer ("Gelva" C5-VIOM), hydroxypropylcellulose ("Klucel" LF) and polyamide (TPX-1002) resins, are exemplified. Examples 52 and 53 include a special disulfonated bis-anthraquinone dye which is noted for its good light- and wetfastness properties on nylon. Examples 47, 50, 51 and 53, with acid dyes and containing 1% of ammonium oxalate, provided brighter and tinctorially stronger prints on nylon than the corresponding toners without ammonium oxalate. Citric acid, present either in the toner (Example 49) or sprayed on the toner fused nylon (Example 48), was found to significantly improve dye fixation.

EXAMPLE 54

This example illustrates the preparation of a ferromagnetic toner containing a fiber-reactive dye, magnetic components and an aqueous alkali-solution resin and the application thereof to cotton.

A magnetic toner was prepared by spray-drying a mixture containing 30% of polyvinyl acetic copolymer resin ("Gelva" C5-VIOM), 33% of Carbonyl Iron GS-6, 33% of "Mapico" Black Iron Oxide, 2% of C.I. Reactive Blue 7 (C.I. 61125) and 2% of inorganic diluent. The spray-dried product was sieved through a 200 mesh screen and fluidized with 0.3% Quso WR-82. A latent magnetic image such as described in Example 1 was manually decorated with the above toner and the decorated image was electrostatically transferred to 100% cotton twill fabric by applying a 20 KV negative potential to the backside of the fabric. The printed fabric was steam fused at 100° C and 1 atm pressure for 10 seconds. The toner fused cotton fabric was then sprayed with an aqueous solution containing 100 parts per liter of urea and 15 parts per liter of sodium bicarbonate. This overspray is required to chemically link the reactive dye to the cotton by forming a covalent dye-fiber bond. Following the spray application, the cotton fabric was dried and the dye was fixed by heating at 190° C for 3 minutes in a hot air oven. The fabric was then scoured at 65° C in aqueous detergent. A brilliant blue print having excellent washfastness properties was obtained.

EXAMPLE 55

A spray-dried magnetic toner containing 30% of polyvinyl acetate copolymer resin ("Gelva" C5-VIOM), 33% of Carbonyl Iron GS-6, 33% of "Mapico" Black Iron Oxide, 2% of Reactive Yellow 2 and 2% of inorganic diluent was directly printed on 100% cotton twill fabric in general accord with the procedure described in Example 54. The toner was steam fused and the printed fabric was sprayed with an aqueous solution containing 100 parts per liter of urea and 15 parts per liter of sodium bicarbonate. The dye was fixed by heating at 182° C for 3 minutes and the fabric was scoured at 65° C in aqueous detergent. A bright yellow print was obtained.

EXAMPLE 56

Following the procedure of Example 55, a spray-dried ferromagnetic toner containing 30% of polyvinyl acetate copolymer resin ("Gelva" C5-VIOM), 33% of Carbonyl Iron GS-6, 33% of "Mapico" Black Iron Oxide, 2%, C.I. Reactive Red 2 and 2% of diluent was directly printed on 100% cotton twill fabric. The toner was steam fused, the printed fabric was oversprayed with aqueous urea/sodium bicarbonate and the dye was fixed. After scouring, a bright red print was obtained.

EXAMPLE 57

This example illustrates the preparation of a ferromagnetic toner containing a reactive dye, a disperse dye, magnetic components and an aqueous alkali-soluble resin and the application thereof to polyester/cotton-blend fabric.

A magnetic toner was prepared by spray-drying a mixture containg 30% of polyvinyl actate copolymer resin ("Gelva" C5-VIOM), 30% of Carbonyl Iron GS-6, 31.1% of "Mapico" Black Iron Oxide, 3% of a 60/40 mixture of a yellow disperse dye of the formula shown as (B) in Table VII and C.I. Reactive Yellow 2 and 5.9% of inorganic diluent. The toner was sieved through a 200 mesh screen and fluidized with 0.2% of Quso WR-82. Toner decoration of a latent magnetic image was carried out as described in Example 1. The toner decorated image was electrostatically transferred directly to 65/35 polyester/cotton poplin fabric and steam fused at 100° C and 1 atm pressure for 10 seconds. Dye fixation was accomplished by heating the fabric at 210° C for 100 seconds in a hot air oven. The printed fabric was finally scoured at 60° C in aqueous detergent. A bright yellow well-defined print was obtained.

EXAMPLE 58

A spray-dried magnetic toner containing 30% of polyvinyl acetate copolymer resin ("Gelva" C5-VIOM), 30% of Carbonyl Iron GS-6, 30.1% of "Mapico" Black Iron Oxide, 3% of a 76/24 mixture of a blue disperse dye of the formula shown as (C) in Table VII and C.I. Reactive Blue 7 and 6.9% of inorganic diluent was directly printed on 65/35 polyester/cotton poplin and steam fused as described in Example 57. The printed fabric was fixed by heating at 200° C for 100 seconds and then scoured at 60° C in aqueous detergent. A bright blue print was obtained.

EXAMPLE 59

This example illustrates the preparation of a ferromagnetic toner containing a sulfur dye, magnetic components and an aqueous alkali-soluble resin and the application thereof to cotton.

A spray-dried magnetic toner containing 32.6% of polyvinyl acetate copolymer resin ("Gelva" C5-VIOM), 32.6% of Carbonyl Iron GS-6, 32.6% of "Mapico" Black Iron Oxide and 2.2% of C.I. Leuco Sulfur Blue 13 (C.I. 53450) was prepared, sieved through a 200 mesh screen and fluidized with 0.2% of Quso WR-82. A toner decorated latent magnetic image was electrostatically transferred, by a procedure such as described in Example 1, to 100% cotton fabric. The toner was steam fused at 100° C and 1atm pressure for 10 seconds. The printed fabric was subsequently padded from an aqueous bath containing 300 parts per liter of sodium sulfhydrate at a pickup of approximately 50%. The leuco dye was then immediately steam fixed at 100° C and 1 atm pressure for 60 seconds. After fixation, the printed fabric was developed by oxidation at 50° C in an aqueous bath containing 4 parts per liter of sodium perborate. The fabric was finally scoured at 60° C in an aqueous bath containing 2 parts per liter of diethanolamine oleyl sulfate surface-active agent. A blue print was obtained.

EXAMPLE 60

This example illustrates the preparation of a ferromagnetic toner containing a vat dye, magnetic components and an aqueous alkali-soluble resin and the application thereof to cotton fabric.

A spray-dried magnetic toner containing 29% of polyvinyl acetate copolymer resin ("Gelva" C5-VIOM), 32.9% of Carbonyl Iron G5-6, 32.9% of "Mapico" Black Iron Oxide, 2.7% of C.I. Vat Red 10 (C.I. 67,000) and 2.5% of diluent was used to manually decorate a latent magnetic image on a 300 line per inch (12 per mm) magnetically structured $CrO_2$ coated aluminized "Mylar" film. The toner decorated latent image was electrostatically transferred to 100% cotton twill fabric and the toner was steam fused at 100° and 1 atm pressure for 10 seconds. The printed cotton fabric was then padded from a reducing bath containing 60 parts per liter or soua asn
60 parts per liter of sodium hydrosulfite
2 parts per liter of sodium octyl/decyl sulfate surface-active agent
15 parts per liter of amylopectin thickening agent
2 parts per liter of 2-ethylhexanol at a pickup of 70 to 80% and flash aged at 132° C for 45 seconds. The fabric was rinsed in cold water, oxidized for 1 minute at 60° C in a bath containing 2% hydrogen peroxide and 2% glacial acetic acid, rinsed and scoured for 5 minutes at 82° C in 0.5 part per liter (aqueous) of a diethanolamine oleyl sulfate surface-active agent. A bright red print was obtained.

Example 61

A spray-dried ferromagnetic toner containing 30% of polyvinyl acetate copolymer resin ("Gelva" C5-VIOM), 33% of Carbonyl Iron GS-6, 33% of "Mapico" Black Iron Oxide, 2% of C.I. Vat Blue 6 (C.I. 69825) and 2% of diluent was prepared and the latent image produced therewith was transferred directly to 100% cotton twill fabric. The transferred directly to 100% cotton twill fabric. The toner was fused, the vat dye was fixed and the printed fabric was scoured as described in Example 60. A bright blue print was obtained.

EXAMPLE 62

A spray-dried ferromagnetic toner containing 30% of polyvinyl acetate copolymer resin ("Gelva" C5-VIOM), 33% of Carbonyl Iron GS-6, 33% of "Mapico" Black Iron Oxide, 2% of C.I. Vat Yellow 22 and 2% of diluent was prepared and printed on 100% cotton twill fabric by a procedure substantially as described in Example 60. A yellow print was obtained.

EXAMPLE 63

This example illustrates the preparation of a ferromagnetic toner containing a premetalized acid dye, magnetic components and an aqueous alkali-soluble resin and the application thereof to nylon.

A spray-dried magnetic toner was prepared so as to contain 30% of polyvinyl acetate copolymer resin ("Gelva" C5-VIOM), 31.4% of Carbonyl Iron GS-6, 31.4% of "Mapico" Black Iron Oxide, 2% of C.I. Acid Yellow 151 (a sulfonated premetalized azo dye) and 5.2% of inorganic diluent. the toner was sieved through a 200 mesh screen and fluidized with 0.2% of Quso WR-82. A toner decorated latent magnetic image such as described in Example 1was electrostatically transferred to nylon 66 jersey fabric and steam fused at 100° C and 1 atm pressure for 10 seconds. The premetalized acid dye was fixed by cottage-steaming the fabric at 7 psig (0.5 kg per sq cm gauge) for 1 hour. The printed fabric was then scoured at 65° C in an aqueous solution of 2parts per liter of each of sodium hydrosulfite, soda caustic and polyethoxylated tridecanol surfactant. A second toner transfer was made to nylon 66 jersey fabric. The toner was steam fused and the fabric was oversprayed with a 50% aqueous solution of citric acid. The dye was fixed by cottage-steaming at 7 psig (0.5 kg per sq cm gauge) for 1 hour and the printed fabric was caustic-hydro scoured as above. In both cases, strong well-defined yellow prints were obtained.

EXAMPLE 64

Using the procedures substantially as disclosed in Example 63, a spray-dried ferromagnetic toner containing 30% of polyvinyl acetate copolymer resin ("Gelva" C5-VIOM), 32.1% of Carbonyl Iron GS-6, 33% of "Mapico" Black Iron Oxide, 2% of C.I. Acid Red 182 (premetallized azo dye) and 2.9% of inorganic diluent was prepared and electrostatically transferred to nylon 66 jersey fabric. After steam fusing, cottage-steaming and scouring, a well-defined bright red print fabric was obtained. A similar sharp red print was obtained when the fabric was oversprayed with 50% aqueous citric acid prior to cottage-steaming.

EXAMPLES 65 to 68

Examples 65 to 68 illustrate the preparation of ferromagnetic toners containing cationic-disperse dyes, magnetic components and an aqueous alkali-soluble resin and the application thereof to acid-modified polyester, polyacrylonitrile and cellulose acetate.

Cationic-disperse dyes, that is, water-insoluble salts of dye cations and selected arylsulfonate anions, are well-known in the art for dyeing acid-modified polyester and acrylic fibers. Cationic-disperse dye toners were prepared by manually mixing the appropriate ingredients (20% nonvolatile solids) and spray-drying. The spray-dried toners were sieved through a 200 mesh screen and fluidized with 0.2% of Quso WR-82. Details are summarized in Table IV. Examples 65 to 67 use 1,5-naphthalenedisulfonate as the anion and Example 68 uses 2,4-dinitrobenzenesulfonate as the anion. Toner decoration of a latent magnetic image and electrostatic transfer to the fabric substrate were preformed as described in Example 1. The toners were steam fused and the printed fabrics were oversprayed with 50% aqueous citric acid to aid in dye fixation. The dyes were fixed by either cottage-steaming or high-pressure steaming the sprayed fabrics. After scouring, in each example, a well-defined print was obtained.

EXAMPLE 69

This example illustrates the preparation of a ferromagnetic toner containing a fluorescent brightening agent, magnetic cmponents and an aqueous alkali-soluble resin and the application thereof to cotton.

a magnetic toner containing 30% of polyvinyl acetate copolymer resin ("Gelva" C5-VIOM), 34% of Carbonyl Iron GS-6, 34% of "Mapico" Black Iron Oxide and 2% of C.I. Fluorescent Brightener 102 was prepared by spray-drying an aqueous 20% nonvolatile solids mixture of the ingredients. The spray-dried toner was sieved through a 200 mesh screen and fluidized with 0.2% of Quso WR-82. A latent magnetic image such as described in Example 1 was toner decorated and the image was electrostatically transferred to 100% cotton sheeting. The toner was steam fused and the brightener was fixed by heating the fabric at 100° C and 1 atm pressure for 25 minutes. The printed fabric was then scoured at 60° C in an aqueous solution of 2 parts per liter of soda caustic and 2 parts per liter of polyethoxylated tridecanol surfactant. Upon exposure to an ultraviolet light source, the printed fabric strongly fluoresced in the imaged areas.

EXAMPLES 70 to 74

These examples illustrate the preparation of ferromagnetic toners containing a chemical-resist agent, magnetic components and an aqueous alkali-soluble resin and the application thereof to nylon. The toners were prepared by spray-drying an aqueous 20% nonvolatile solids slurry of the appropriate ingredients. The spray-dried toners were sieved through a 200 mesh screen and fluidized with 0.2% of Quso WR-82. Details are summarized in Table V. The chemical-resist toners were evaluated by manual decoration of the latent magnetic image on a 300 line per inch (12 per mm) magnetically structured $CrO_2$ coated aluminized "Mylar" film by procedures substantially the same as described in Example 1. The toner-decorated images were transferred electrostatically to nylon 66 jersey fabric and steam fused at 100° C and 1 atm pressure for 10 to 15 seconds. The chemical resist in each example was fixed by steaming (atmospheric) the fabric for 20 minutes. Each printed fabric was rinsed in water to remove the resin and the magnetic components and finally dried. Each resultant resist printed nylon fabric was then overdyed with either a red biscationic dye of the formula shown as (D) or a blue diacidic (anionic) dye of the formula shown as (E), or a mixture thereof, the (D) and (E) formulas being given in Table VII, by the following procedure:

Resist-printed nylon fabric (5parts) was added to 300 parts of water containing:

ethylenediaminetetraacetic acid, tetrasodium salt . . . . 0.013 part (0.25% owf)

a sulfobetaine of the formula shown as (F) in Table VII . . . .0.05 part (1.0% owf)

tetrasodium pyrophosphate . . . .0.010 part (0.2% owf).

The dye bath was adjusted to pH 6 with monosodium phosphate and the temperature was raised to 27° C and held at this temperature for 10 minutes. The cationic dye (0.025 part; 0.5% owf, that is, on weight of fiber) and/or the acidic dye (0.025 part; 0.5% owf) were added. When both types of dyes were employed, the bath containing the cationic dye was held at 27° C for 5minutes prior to the addition of the anionic dye. After completion of the dye(s) addition the bath was maintained at 27° C for 10 minutes, the temperature was raised at about 2° C per minute to 100° C and held at this temperature for 1 hour. Each fabric was rinsed in cold water and dried. The printed-resist fabrics remained unstained in the imaged areas during the subsequent overdyeing process.

Toners containing, 2, 4, 6 and 8% of a chemical-resist agent of the formula shown as (G) in Table VII and binary soft (Fe) and hard ($Fe_3O_4$) magnetic materials are illustrated in Examples 70 to 73; they showed excellent chemical-resist properties on nylon. An analogous magnetic-resist toner containing only chromium dioxide as the hard magnetic component (Example 74) also provided satisfactory printed resist on nylon.

EXAMPLE 75

This example illustrates the multicolor printing of polyester with ferromagnetic disperse dye toners containing water-soluble resins.

A semitransparent nonconductive $CrO_2$ film was prepared by embossing a 5-mil (0.127 mm) thick flexible cellulose acetate film with a 500 line per inch (20 per mm) pattern of parallel grooves. Chromium dioxide mixed in an alkyd binder was doctored over the surface of the embossed transparent support and then cured to bind the magnetic material to the support by a procedure known in the art, for example, as described in U.S. Pat. No. 3,554,798. The film was magnetized by passing it over the poles of a bar magnet of approximately 1,500 gauss average field strength. A photocolor separation of a printed design was made by photographing the design three times through red, green and blue filters. Exposure through the red filter produced a negative recording of the red light in the printed original. A cyan film positive recording the remaining green and blue primaries present in the original print was obtained. Exposure through the green filter produced a negative recording of the green in the original print, and a magenta film positive recording the remaining red and blue primaries was obtained. Similarly, exposure through the blue filter produced a negative recording of the blue in the original print, and a yellow film positive was obtained. A separate latent magnetic image of each of the cyan, magenta and yellow colors making up the design to be printed was developed by placing the photocolor separated film positive of the desired color in contact with the aforesaid magnetized semitransparent $CrO_2$ film and uniformly illuminating by a Xenon flash passing through the film positive. The dark areas of the film positive, that is, the image areas, absorb the energy of the Xenon flash, whereas the clear areas transmit the light and heat the $CrO_2$ beyond its 116° C Curie point, thereby demagnetizing the exposed magnetic $CrO_2$ lines. A latent magnetic image corresponding to the dark areas of the film positive was obtained. The resultant cyan, magenta and yellow latent magnetic images were manually decorated with the blue, red and yellow disperse dye toners of Examples 1, 15 and 4, respectively. An AC corona was passed over the surface of each toner decorated image to dissipate any static charges. The cyan toner-decorated latent image was electrostatically transferred at 20 KV negative potential directly to 100% polyester woven cloth. The magenta and yellow toner-decorated images were similarly successively transferred to the same polyester fabric, thereby providing a multicolored printed design. Following transfer, the disperse dyes were fixed by heating the printed fabric at 205° C and 1.5 psi (0.11 kg per sq cm) for 40 seconds. The printed fabric was then scoured at 60° C in an aqueous solution of 2 parts per liter of sodium hydrosulfite and 2 parts per liter of soda caustic. A well-defined multicolored printed design was obtained.

EXAMPLE 76

A ferromagnetic disperse dye toner containing 30% of a polyamide resin ("Versamid" 930), 34% of Carbonyl Iron GS-6, 34% of "Mapico" Black Iron Oxide and 2% of C.I. Disperse Yellow 54 was prepared by ball-milling and spray-drying a 20% nonvolatile solids toluene-isopropanol slurry of the ingredients by a procedure substantially as described in Example 3. "Versamid" 930 is a water-insoluble resin having a molecular weight of about 3,100 and a softening temperature of 105°-115° C. Such water-insoluble resins are disclosed as having utility in prior art, known magnetic toners, for example, such as disclosed by Hall and Young in U.S. Pat. No. 3,627,682.

A magnetic disperse dye toner containing 31.1% of polyvinyl acetate copolymer resin ("Gelva" C5-VIOM), 30.7% of Carbonyl Iron GS-6, 30.7% of "Mapico" Black Iron Oxide, 1.9% of C.I. Disperse Blue 56 and 5.6% of dispersant was prepared by spray-drying an aqueous slurry of the ingredients containing 20% of nonvolatile solids.

Both of the aforesaid toners were manually applied to the latent images on a $CrO_2$-coated aluminized "Mylar" film and electrostatically transferred to 100% polyester double-knit fabric by procedures substantially the same as described in Example 1. The toners were steam fused and the disperse dyes were fixed by heating the printed fabrics at 210° C and 1 atm pressure for 15 seconds. The printed fabrics were then scoured at 75° C in an aqueous solution of 4 parts per liter of caustic soda, 4 parts per liter of sodium hydrosulfite and 2 parts per liter of "Lakeseal" detergent. The fabric printed with the disperse dye toner containing the water-soluble resin was completely clear of resin and magnetic components after just a few seconds of gentle stirring in the scouring medium. The fabric printed with the water-insoluble resin was not clear of resin and magnetic components even after 15 minutes scouring at 75° C. Thus, the resin impregnated magnetic particles were much more easily removed from the printed fabric using the dye toner containing the water-soluble resin as compared to the toner containing the water-insoluble resin. This is a critical feature since the presence of the black iron-iron oxide on the fabric surface effectively masks the color of the dye fixed in the fabric. In the aforesaid experiment employing the water-soluble polyvinyl acetate resin, scoured fabric was printed to a bright blue whereas in the experiment employing the water-insoluble polyamide resin, the scoured fabric was printed to a dark brown to black, completely masking the bright yellow color of the dye employed.

EXAMPLE 77

This example illustrates the preparation of a ferromagnetic dye toner containing a yellow disperse dye, magnetic components and a water-soluble natural resin, and the application thereof to paper and polyester.

A mixture of 350 parts of a commercially available 20% aqueous solution of a maleic anhydride-rosin derivative ("Unirez" 7057), 28.4 parts of C.I. Disperse Yellow 54 as a 28.2% standardized powder containing a 50/50 mixture of lignin sulfonate and sulfonated naphthalene-formaldehyde as a dispersant, 60 parts of "Mapico" Black Iron Oxide and 59.6 parts of Carbonyl Iron GS-6 was stirred for 30 minutes on a high-speed shear mixer. Water (502 parts) was added and the resultant slurry was spray-dried to give a final toner composition containing 35% of esterified rosin, 4% of C.I. Disperse Yellow 54, 1.2% of the lignin sulfonate/sulfonated naphthalene-formaldehyde dispersant, 30% of "Mapico" Black Iron Oxide and 29.8% of Carbonyl Iron GS-6. The toner was sieved through a 200 mesh (U.S. Sieve Series) screen and fluidized with 2% of Quso WR-82. A latent magnetic image such as described in Example 1 was manually decorated with the toner and the toner decorated image was transferred electrostatically to both paper and polyester substrates by applying a 20 KV negative potential, using a DC corona, to the backside of the substrate. After transfer the image was steam-fused on each substrate. After direct transfer and fusion to the polyester fabric, the dye image was fixed by heating for 30 seconds at 210° C and 1 to 1.5 psi (0.07 to 0.11 kg per sq cm) pressure. The dye was also heat transfer printed from the paper to polyester fabric by placing the fused image-bearing paper face down on the polyester and applying 1 to 1.5 psi (0.07 to 0.11 kg per sq cm) pressure for 30 seconds at 210° C. Each of the fabrics, after dye fixation, was scoured with hot aqueous alkaline detergent. Deep yellow prints were obtained on each, that is, the polyester which was directly printed and the polyester which was heat transfer printed from paper.

EXAMPLE 78

This example illustrates the preparation of a ferromagnetic dye toner containing a yellow disperse dye, magnetic components and an aqueous alkali-soluble polyacrylic acid resin, and the application thereof to paper and polyester.

A ferromagnetic toner was prepared by spray-drying a mixture containing 35% of a commercially available, aqueous alkali-soluble polyacrylic acid resin ("Joncryl"678), 4% of C.I. Disperse Yellow 54, 1.2% of a 50/50 mixture of lignin sulfonate and sulfonated naphthalene-formaldehyde dispersant, 30% of "Mapico" Black Iron Oxide and 29.8% of Carbonyl Iron GS-6. The spray-dried toner was sieved through a 200 mesh (U.S. Sieve Series) screen and fluidized with 0.1% of Quso WR-82. The toner was used to manually decorate a latent magnetic image on the surface of a printing base such as described in Example 1. The decorated image was then electrostatically transferred and steam fused to paper and subsequently heat transfer printed from the paper to 100% polyester fabric as described in Example 77. The image was also directly printed to 100% polyester fabric as described in Example 77. In both cases the fixed printed fabrics were scoured at 65° C in an aqueous polyethoxylated tridecanol surfactant solution; deep yellow prints were obtained on both fabrics.

EXAMPLE 79

This example illustrates the preparation of a ferromagnetic dye toner containing a red disperse dye, a magnetically hard component and an aqueous alkali-soluble polyvinyl acetate copolymer resin, and the application thereof to paper and polyester film and fabric.

A ferromagnetic toner was prepared by spray-drying a mixture containing 30% of polyvinyl acetate copolymer resin, 65.8% of a commercially available $Fe_3O_4$-cobalt alloy ("HiEN"-527) containing 1 to 2 mole percent of cobalt, 1% of C.I. Disperse Red 60 and 3.2% of a lignin sulfonate dispersant. The toner was passed through a 200 mesh screen. The toner flow properties were excellent. The toner was used to manually decorate a latent magnetic image on the surface of a printing base such as described in Example 1. The decorated image was electrostatically transferred to paper, steam fused and then heat transfer printed from the paper to 100% polyester fabric. The image was also directly transferred to both 100% polyester fabric and "Mylar" polyester film and then steam fused. In each case permanent dye fixation was achieved by heating the printed film or fabric substrate at 205°–210° C and 1.5 psi (0.11 kg per sq cm) pressure for 40 seconds. The printed substrates were finally scoured at 82° C in an aqueous solution of 2 parts/liter of caustic soda, 2 parts/liter of hydrosulfite and 2 parts/liter of a polyethoxylated tridecanol surfactant. Bright red prints were obtained in each case.

EXAMPLE 80

This example illustrates the preparation of a ferromagnetic dye toner containing a yellow disperse dye, magnetic components and a water-soluble polyacrylic acid resin, and the application thereof to both paper and polyester.

A ferromagnetic toner was prepared by spray-drying a mixture containing 35% of a polyacrylic acid resin ("Joncryl" 678), 4% of C.I. Disperse Yellow 54, 1.2% of a 1 to 1 mixed lignin-sulfonate/sulfonated naphthaleneformaldehyde dispersant, 30% of "Mapico" Black Iron Oxide and 29.8% of Carbonyl Iron GS-6. The spray-dried toner was sieved through a 200 mesh screen (U.S. Sieve Series) and fluidized with Quso WR-82 in a high-speed Waring blender. Outstanding toner flow and decoration properties were obtained using from 0.1 to 0.2% of Quso WR-82 at low blending speeds for 20 to 30 seconds. The toner was used to develop the latent magnetic image on the surface of a $CrO_2$-coated aluminized polyester printing member (such as 1 as shown in FIG. 1) using a printing apparatus such as depicted in FIG. 11. Any subsequent numbered references in this example refer to said FIG. 11. A continuous 0.18 mil (4.6 micron) coating of $CrO_2$ dispersed in a resin binder was uniformly applied to the surface of an aluminized 2 mil (50.8 micron) polyester film base ("Mylar"). The $CrO_2$ particles dispersed in the resin binder were applied to the aluminized polyester film in the presence of a magnetic field to orient the particles parallel to the length of the film. The film was then magnetically structured into a 250 to 450 lines per inch (98 to 178 lines per cm) magnetic pattern using a 0.5 inch (1.3 cm) wide magnetic write head. The structured film was imagewise demagnetized by exposure to a short burst from a Xenon lamp flashed through an image-bearing photographic transparency. The resultant partially demagnetized aluminized $CrO_2$ film was then mounted on a rotary drum (such as 12 of FIG. 11). The magnetic image on the $CrO_2$-coated aluminized polyester film was developed with toner particles 15 applied by means of magnetic brush 16. Both the brush and the film drum were driven at the same surface speed of 40 ft/min (12.2 meters per minute). Excess toner was removed from the background of the decorated printing member by means of neutralizing AC corona 18 and air knife 19. The pressure of the air stream supplied by the air knife was adjusted to the point where only the excess toner and not the toner decorating the magnetic imge was removed. Air supplied at a pressure of 0.4 inch (1 cm) of water from an orifice held 0.25 inch (0.6 cm) from the surface of the printing member fulfilled these conditions. The toner-decorated image on the printing member was electrostatically transferred to polyethylene terephthalate fabric 5 by charging the back of the fabric with DC corona discharge device 20 which comprised a corona wire spaced about 0.5 inch (1.3 cm) from the fabric and maintained at 5,000 volts negative potential. Following transfer, the toner particles were fused to the fabric by heating at 90 to 120° C using two banks of 500 watt infrared lamps 24 placed approximately 1 inch (2.5 cm) from the fabric and operating at 93% efficiency. The printed polyethylene terephathalate fabric was finally removed on take-up roll 28. Toner particles remaining on the surface of printing member 1 were removed by vacuum brush 21 and the surface was neutralized with AC corona 22 prior to redecoration.

A similar run, made in a similar fashion and providing similar results, was made using paper as the substrate.

EXAMPLE 81

This example illustrates the preparation of a ferromagnetic dye toner containing a red disperse dye, a soft magnetic component and an aqueous alkali-soluble resin, and the application thereof to paper.

A ferromagnetic toner was prepared by spray-drying a mixture containing 10% of polyvinyl acetate copolymer resin ("Gelva" C5-VIOM), 1% of C.I. Disperse Red 60,, 3.2% of lignin sulfonate dispersant and 85.8% of Carbonyl Iron GS-6. The spray-dried toner was fluidized with 1% of Quso WR-82 and used to develop the latent magnetic image on the surface of a continuously $CrO_2$-coated (220 microinches) ($5.59 \times 10^{-4}$cm) aluminized "Mylar" polyester printing member (such as 1 depicted in FIG. 1) using a printing apparatus such as that depicted in FIG. 11. The $CrO_2$ surface of the printing member was magnetically structured into a 500 lines per inch (197 lines per cm) magnetic pattern using a magnetic write head; it was then imagewise demagnetized by exposure to a short burst from a Xenon lamp flashed through an image-bearing photographic transparency. The resultant latent magnetic image was developed with the toner particles and the toner decorated image was electrostatically transferred to paper and fused thereon as described in Example 80. A well-defined, background-free red print was obtained.

EXAMPLE 82

A ferromagnetic toner containing 36% of polyvinyl acetate copolymer resin ("Gelva" C5-VIOM), 1% of C.I. Disperse Red 60, 3.2% of lignin sulfonate dispersant and 59.8% of Carbonyl Iron GS-6 was similarly prepared and applied to paper as described in Example 81. The results were comparable to those of Example 81.

EXAMPLE 83

This example illustrates the magnetic transfer printing of a ferromagnetic dye toner containing a blue disperse dye, magnetic components and an aqueous alkali-soluble resin.

A ferromagnetic toner was prepared by spray-drying a mixture containing 25% of polyvinyl acetate copolymer resin ("Gelva" C5-VIOM), 2% of C.I. Disperse Blue 59 crude powder, 37% of "Mapico" Black Iron Oxide and 36% of Carbonyl Iron GS-6. The toner, which had a particle size within the range 3 to 20 microns, was used to develop the latent magnetic image on the surface of a 197 lines per cm, magnetically structured, $CrO_2$-coated, aluminized "Mylar" polyester film. The toner image was magnetically transferred from the decorated film to paper by application of a magnetic field of approximately 625 gauss average strength supplied by a permanent magnet (approximately 1,200 gauss) placed behind the paper. The toner particles transferred completely from the latent magnetic image on the film to the paper.

EXAMPLE 84

The toner of Example 83 was used to develop the latent magnetic image on the surface of a $CrO_2$-coated aluminized polyester printing member (such as 1 as shown in FIG. 1) using a printing apparatus such as depicted in FIG. 11. The toner decorated image on the printing member was magnetically transferred to paper using a 1,200 gauss permanent magnet in place of the DC corona discharge device 20 depicted in FIG. 11. Using a field strength of 540 gauss, good transfer of the toner particles from the printing member to the paper was obtained.

EXAMPLE 85

The toner of Example 83 was magnetically transferred to paper using a printing apparatus such as depicted in FIG. 11. In this case, however, DC corona discharge device 20 shown in FIG. 11 was replaced by a metal pressure roll wrapped with a 0.25 inch (0.64 cm) layer of a flexible, permanent magnetic material, such as a rubber bonded barium ferrite (commercially available under the trademark "Plastiform"). At a surface field strength of 370 gauss, the magnetic roll pressed the paper against the decorated image and good toner transfer was obtained.

It is to be understood that each above example does not necessarily recite all details regarding the magnetic printing process and/or apparatus of the invention. Any unrecited details relative to the invention can readily be ascertained by one skilled in the art from other examples and/or from the non-example portions of this specification.

The following experiments illustrate the need to use a conductive printing member in order to eliminate static charge buildup on the printing surface.

EXPERIMENT 1

A 180 microinch ($4.6 \times 10^{-4}$ cm) thick coating of $CrO_2$ in a resin binder was applied to the surface of a 5 mil (0.013 cm) polyester film ("Mylar"). The resultant $CrO_2$ film had a coercivity of 567 oersteds and a resistivity of approximately $10^8$ ohms/square. The film was mounted and electrically connected to a 5-inch (12.7 cm) wide, 5-inch (12.7 cm) diameter grounded aluminum drum. The $CrO_2$ surface was revolved past a DC corona at a speed of 0.4 to 1.5 seconds per revolution. At only 7,000 volts positive corona potential, a surface charge was found to rapidly build up (resulting in a field increase of approximately 1,000 volts per cm per revolution of the drum) on the $CrO_2$ film. Thus, the $CrO_2$ film surface was not conductive enough to dissipate the charge from the corona.

EXPERIMENT 2

The conductivity experiment described in Experiment 1 was repeated, except that two AC coronas were placed about 0.25 inch (0.6 cm) from the film surface in order to neutralize surface charges. At 2,000 volts negative DC corona potential, no surface charge buildup was detected on the $CrO_2$ film. At 8,000 volts negative DC potential, only a 600 volt buildup was measured on the film surface. Thus, the AC coronas effectively dissipated the surface charges below 2,000 volts DC potential but did not completely remove all the charge from the film surface at higher potentials.

EXPERIMENT 3

A 120 microinch ($3 \times 10^{-4}$ cm) thick layer of $CrO_2$ in a resin binder was applied to the surface of a thin copper sheet. The $CrO_2$-coated copper sheet was mounted on a grounded drum and subjected to a 3,500 volt positive potential from a DC corona as described in Experiment 1. When tested for static charge buildup using a commercially available static voltmeter, the $CrO_2$ surface was found to be highly resistant to charge buildup.

EXPERIMENT 4

A 65 microinch ($1.65 \times 10^{-4}$ cm) coating of $CrO_2$ in a resin binder was applied to the surface of a 2 mil (0.005 cm) aluminized polyester film ("Mylar"). During the coating operation, the $CrO_2$ was magnetically oriented by passing the coated film between identical poles of two bar magnets having an approximate field strength of 1,500 gauss. The coated film was calendered by heating in contact with hot rollers at 90° C under high pressure. The resultant $CrO_2$-coated film had a coercivity of 526 oersteds and an orientation of 0.80. When tested for static buildup properties as described in Experiment 1, the $CrO_2$-coated aluminized film was found to be highly resistant to charge buildup when electrically connected to the grounded drum.

EXPERIMENT 5

A 5-inch (12.7 cm) wide by 5-inch (12.7 cm) diameter copper sleeve was directly coated with a 200 microinch ($5 \times 10^{-4}$ cm) layer of $CrO_2$ in a resin binder. The sleeve was dip coated from a slurry of $CrO_2$ and resin in tetrahydrofuran-cyclohexanone (25:75 by weight) and the solvents were slowly removed by evaporation. A pair of permanent magnets was used to orient the $CrO_2$ as described in Experiment 4. The $CrO_2$ surface showed little tendency to sustain a static charge when electrically connected to the grounded drum.

The copper sleeve can also be chemically etched into a 250 to 350 lines per inch (98 to 138 lines per cm) grooved pattern and the grooves filled with the $CrO_2$ and resin binder. This would provide a hard, conductive, permanently structured magnetic printing surface.

TABLE I

FERROMAGNETIC DISPERSE DYE TONERS CONTAINING WATER-SOLUBLE RESINS

| | Toner Composition (Wt. %) | | | | | Resin | |
|---|---|---|---|---|---|---|---|
| Ex. No. | Resin[a] | Soft Mag. Comp.[b] | Hard Mag. Comp.[c] | Dye | Other[d] | Mag. Comp. | Remarks[e] |
| 4 | PVAC (28) | Fe (34) | $Fe_3O_4$ (34) | C.I. Disperse Yellow 54 (2) | 2 | 0.41 | HTP(PE)[f,g]; DP(PE)[i,f,g]; DP(Pap)[i] |
| 5 | PVAC (29.1) | Fe (34) | $Fe_3O_4$ (33) | C.I. Disperse Blue 56 (1) | 2.9 | 0.43 | DP(PE)[h,f,i] |
| 6 | PVAC (26) | Fe (28.7) | $Fe_3O_4$ (28.7) | C.I. Disperse Blue 56 (4.3) | 12.3 | 0.45 | DP(PE)[h,f,i] |
| 7 | PVAC (23) | Fe (23.1) | $Fe_3O_4$ (23.1) | C.I. Disperse Blue 56 (7.6) | 23.2 | 0.50 | DP(PE)[h,f,i] |
| 8 | PVAC (20.5) | Fe (19.2) | $Fe_3O_4$ (18.5) | C.I. Disperse Blue 56 (10.3) | 31.5 | 0.54 | DP(PE)[h,f,i] |
| 9 | PVAC (18.6) | Fe (15.5) | $Fe_3O_4$ (15.5) | C.I. Disperse Blue 56 (12.4) | 38 | 0.60 | DP(PE)[h,f,i] |
| 10 | PVAC (15.7) | Fe (10.4) | $Fe_3O_4$ (10.4) | C.I. Disperse Blue 56 (15.7) | 47.8 | 0.75 | DP(PE)[h,f,i] |
| 11 | PVAC (13.5) | Fe (6.8) | $Fe_3O_4$ (6.8) | C.I. Disperse Blue 56 (18.0) | 54.9 | 1.0 | DP(PE)[h,f,i] |
| 12 | PVAC (9.4) | Fe (41.5) | $Fe_3O_4$ (41.5) | C.I. Disperse Blue 56 (1.9) | 5.7 | 0.11 | DP(PE)[h,f,i] |
| 13 | PVAC (60) | Fe (19) | $Fe_3O_4$ (20) | C.I. Disperse Blue 56 (1) | — | 1.54 | DP(PE)[h,f,i] |
| 14 | PVAC (30) | Fe (28) | $Fe_3O_4$ (27) | C.I. Disperse Blue 56 (15) | — | 0.55 | DP(PE)[h,f,i] |
| 15 | PVAC (28.2) | Fe (32) | $Fe_3O_4$ (32) | C.I. Disperse Red 60 (1.9) | 5.9 | 0.44 | DP(PE)[h,f,i] |
| 16 | PAM (28.2) | Fe (32) | $Fe_3O_4$ (32) | C.I. Disperse Red 60 (1.9) | 5.9 | 0.44 | DP(PE)[h,f,i] |
| 17 | HPC (28.2) | Fe (32) | $Fe_3O_4$ (32) | C.I. Disperse Red 60 (1.9) | 5.9 | 0.44 | DP(PE)[h,f,i] |
| 18 | PVAC (45) | None | $Fe_3O_4$ (46.9) | C.I. Disperse Red 60 (1.9) | 6.2 | 0.96 | DP(Ny)[h,f,g] |
| 19 | PVAC (45) | None | $Fe_3O_4$ (46.9) | C.I. Disperse Red 60 (1.9) | 6.2 | 0.96 | DP(Ny)[h,f,g] |
| 20 | PVAC (60) | None | $Fe_3O_4$ (35.8) | C.I. Disperse Red 60 (1) | 3.2 | 1.7 | DP(PE)[h,f,i] |

TABLE I-continued

FERROMAGNETIC DISPERSE DYE TONERS CONTAINING WATER-SOLUBLE RESINS

| | Toner Composition (Wt. %) | | | | | Resin | |
|---|---|---|---|---|---|---|---|
| Ex. No. | Resin[a] | Soft Mag. Comp.[b] | Hard Mag. Comp.[c] | Dye | Other[d] | Mag. Comp. | Remarks[e] |
| 21 | PVAC (30) | None | $CrO_2$ (65.8) | C.I. Disperse Red (1) | 3.2 | 0.45 | DP(PE)$^{h,f,i}$ |
| 22 | PVAC (30) | Fe (32.8) | $CrO_2$ (33) | C.I. Disperse Red 60 (1) | 3.2 | 0.45 | DP(PE)$^{h,f,i}$ |
| 23 | PVAC (51.8) | Fe (22) | $CrO_2$ (22) | C.I. Disperse Red 60 (1) | 3.2 | 1.2 | DP(PE)$^{h,f,i}$ |
| 24 | PVAC (61.8) | Fe (17) | $CrO_2$ (17) | C.I. Disperse Red 60 (1) | 3.2 | 1.8 | DP(PE)$^{h,f,i}$ |
| 25 | PVAC (73.8) | Fe (11) | $CrO_2$ (11) | C.I. Disperse Red 60 (1) | 3.2 | 3.3 | DP(PE)$^{h,f,i}$ |
| 26 | PVAC (29.4) | Fe (33.3) | $Fe_3O_4$ (33.3) | r (1.96) | 1.84 | 0.44 | DP(PE)$^{h,j,g}$; DP(PE)$^{h,k,g}$ |
| 27 | PVAC (30) | Fe (32) | $Fe_3O_4$ (32) | s (2) | 4[1] | 0.47 | DP(PE)$^{h,j,g}$; DP(PE)$^{h,k,g}$; DP(PE)$^{h,p,g}$; DP(PE)$^{h,q,g}$; |
| 28 | PVAC (30) | Fe (33) | $Fe_3O_4$ (33) | s (2) | 2 | 0.45 | DP(PE)$^{h,j,g}$; DP(PE)$^{h,k,g}$; DP(PE)$^{h,p,g}$; DP(PE)$^{h,q,g}$; |
| 29 | PVAC (30) | Fe (31) | $Fe_3O_4$ (31) | s (2) | 6[m] | 0.48 | DP(PE)$^{h,k,g}$; DP(PE)$^{h,j,g}$; |
| 30 | PVAC (30) | Fe (30) | $Fe_3O_4$ (30) | s (2) | 8[n] | 0.50 | DP(PE)$^{h,k,g}$; DP(PE)$^{h,j,g}$; |
| 31 | PVAC (30) | Fe (29) | $Fe_3O_4$ (29) | s (2) | 10[o] | 0.52 | DP(PE)$^{h,k,g}$; DP(PE)$^{h,j,g}$ |
| 32 | PVAC (30) | Fe (23) | $Fe_3O_4$ (22) | C.I. Disperse Blue 56 (25) | — | 0.67 | DP(PE)$^{h,f,i}$ |
| 33 | PVAC (30) | Fe (34.6) | $Fe_3O_4$ (35) | C.I. Disperse Blue 56 (0.10) | 0.3 | 0.48 | DP(PE)$^{h,f,i}$ |

TABLE II

FERROMAGNETIC CATIONIC DYE TONERS CONTAINING WATER-SOLUBLE RESINS

| | Toner Composition (Wt. %) | | | | | Resin | |
|---|---|---|---|---|---|---|---|
| Ex. No. | Resin[a] | Soft Mag. Comp.[b] | Hard Mag. Comp.[c] | Dye | Other[d] | Mag. Comp. | Remarks[e] |
| 38 | PVAC (30) | Fe (30) | $Fe_3O_4$ (31) | C.I. Basic Yellow 11 (2) (C.I. 48055) | 7 | 0.44 | DP(AMPE)$^{h,u,q,i}$; DP(PAN)$^{h,u,v,i}$ |
| 39 | PVAC (30) | Fe (29.6) | $Fe_3O_4$ (30) | C.I. Basic Red 14 (2) | 8.4 | 0.55 | DP(AMPE)$^{h,u,q,i}$; DP(PAN)$^{h,u,v,i}$ |
| 40 | PVAC (30) | Fe (31.4) | $Fe_3O_4$ (31.5) | C.I. Basic Red 19 (2) | 5.1 | 0.48 | DP(AMPE)$^{h,u,q,i}$; DP(PAN)$^{h,u,v,i}$ |
| 41 | HPC (30) | Fe (29.6) | $Fe_3O_4$ (30) | C.I. Basic Red 14 (2) | 8.4 | 0.50 | DP(AMPE)$^{h,q,i}$; DP(AMPE)$^{h,u,q,i}$ |
| 42 | HPC (30) | Fe (29.3) | $Fe_3O_4$ (29.3) | C.I. Basic Red 14 (2) | 9.4[w] | 0.51 | DP(AMPE)$^{h,q,i}$; DP(PAN)$^{h,v,i}$ |
| 43 | PVAC (30) | Fe (28.6) | $Fe_3O_4$ (29) | C.I. Basic Red 14 (2) | 10.4[x] | 0.52 | DP(AMPE)$^{h,q,y}$; DP(PAN)$^{h,v,y}$ |

TABLE III

FERROMAGNETIC ACID DYE TONERS CONTAINING WATER-SOLUBLE RESINS

| | Toner Composition (Wt. %) | | | | | Resin | |
|---|---|---|---|---|---|---|---|
| Ex. No. | Resin[a] | Soft Mag. Comp.[b] | Hard Mag. Comp.[c] | Dye | Other[d] | Mag. Comp. | Remarks[e] |
| 45 | PVAC (30) | Fe (33) | $Fe_3O_4$ (33.4) | C.I. Acid Yellow 174 (2) | 1.6 | 0.45 | DP(Ny)$^{h,u,v,i}$; DP(Ny)$^{h,v,y}$ |
| 46 | PAM (30) | Fe (32.7) | $Fe_3O_4$ (32.7) | C.I. Acid Red 151 (2) (C.I. 26,900) | 2.6[z] | 0.46 | DP(Ny)$^{h,v,i}$ |
| 47 | PAM (30) | Fe (31.4) | $Fe_3O_4$ (31.4) | C.I. Acid Blue 40 (2) | 5.2[z] | 0.48 | DP(Ny)$^{h,v,y}$ |
| 48 | PVAC (28.3) | Fe (32.2) | $Fe_3O_4$ (32.2) | C.I. Acid Blue 40 (2.3) | 5.0 | 0.44 | DP(Ny)$^{h,v,i}$; DP(Ny)$^{h,u,v,i}$ |
| 49 | HPC (28.8) | Fe (32.6) | $Fe_3O_4$ (30.7) | C.I. Acid Blue 40 (1.9) | 6.0[x] | 0.45 | DP(Ny)$^{h,v,i}$ |
| 50 | PVAC (30) | Fe (33) | $Fe_3O_4$ (34) | C.I. Acid Blue 40 (2) | 1[z] | 0.45 | DP(Ny)$^{h,v,y}$ |
| 51 | PAM (30) | Fe (33) | $Fe_3O_4$ (33.4) | C.I. Acid Yellow 174 (2) | 1.6[z] | 0.45 | DP(Ny)$^{h,v,y}$ |
| 52 | PVAC (30) | Fe (33) | $Fe_3O_4$ (33) | C.I. Acid Blue 127 (2) (C.I. 61135) | 2 | 0.45 | DP(Ny)$^{h,v,y}$ |
| 53 | PAM (30) | Fe (32) | $Fe_3O_4$ (33) | C.I. Acid Blue 127 (2) | 3[z] | 0.46 | DP(Ny)$^{h,v,y}$ |

TABLE IV

FERROMAGNETIC CATIONIC-DISPERSE DYE TONERS CONTAINING WATER-SOLUBLE RESINS

| | Toner Composition (Wt. %) | | | | | Resin | |
|---|---|---|---|---|---|---|---|
| Ex. No. | Resin[a] | Soft Mag. Comp.[b] | Hard Mag. Comp.[c] | Dye | Other[d] | Mag. Comp. | Remarks[e] |
| 65 | PVAC (30) | Fe (33) | $Fe_3O_4$ (33) | C.I. Basic Yellow 21 and 1,5 NDS (2)[aa] | 2 | 0.45 | DP(AMPE)$^{h,u,q,i}$; DP(PAN)$^{h,u,v,i}$ |
| 66 | PVAC (30) | Fe (33) | $Fe_3O_4$ (33) | C.I. Basic Red 14 and 1,5 NDS (2)[aa] | 2 | 0.45 | DP(AMPE)$^{h,u,q,i}$; DP(PAN)$^{h,u,v,i}$; DP(Acet)$^{h,u,v,i}$ |
| 67 | PVAC (30) | Fe (33) | $Fe_3O_4$ (33) | C.I. Basic Blue 69 and 1,5 NDS (2)[aa] | 2 | 0.45 | DP(AMPE)$^{h,u,q,i}$; DP(PAN)$^{h,u,v,i}$ |
| 68 | PVAC (30) | Fe (33) | $Fe_3O_4$ (33) | C.I. Basic Blue 77 and 2,4- DNBS (2)[bb] | 2 | 0.45 | DP(AMPE)$^{h,u,q,i}$; DP(PAN)$^{h,u,v,i}$ |

TABLE V

FERROMAGNETIC CHEMICAL-RESIST TONERS CONTAINING WATER-SOLUBLE RESINS

| | Toner Composition (Wt. %) | | | | | |
|---|---|---|---|---|---|---|
| Ex. No. | Resin[a] | Soft Mag. Comp.[b] | Hard Mag. Comp.[c] | Chemical Resist Agent | Resin / Mag. Comp. | Remarks[e] |
| 70 | PVAC (30) | Fe (34) | $Fe_3O_4$ (34) | (2)[cc] | 0.44 | DP(Ny)[h,dd,ee], DP(Ny)[h,dd,ff], DP(Ny)[h,dd,gg] |
| 71 | PVAC (30) | Fe (33) | $Fe_3O_4$ (33) | (4)[cc] | 0.45 | DP(NY)[h,dd,ee], DP(Ny)[h,dd,ff] |
| 72 | PVAC (30) | Fe (32) | $Fe_3O_4$ (32) | (6)[cc] | 0.47 | DP(Ny)[h,dd,ee], DP(Ny)[h,dd,ff] |
| 73 | PVAC (30) | Fe (31) | $Fe_3O_4$ (31) | (8)[cc] | 0.48 | DP(Ny)[h,dd,ee], DP(Ny)[h,dd,ff] |
| 74 | PVAC (30) | None | $CrO_2$(69) | (1)[cc] | 0.43 | DP(Ny)[h,dd,ff], DP(Ny)[h,dd,gg] |

TABLE VI

DEFINITIONS OF SYMBOLS USED IN TABLES I-V

[a]PVAC = polyvinyl acetate copolymer ( 37 Gelva" C5-VIOM); PAM = polyamide polymer (TPX-1002); HPC = hydroxypropylcellulose polymer ("Klucel LF)
[b]All iron is Carbonyl Iron GS-6
[c]All $Fe_3O_4$ is "Mapico" Black Iron Oxide
[d]Dispersants and/or inorganic diluents
[e]HTP = heat transfer printed; DP = directly printed; PE = polyester; Ny = nylon; Pap = paper; AMPE - acid-modified polyester; PAN - polyacrylonitrile; Acet - cellulose acetate
[f]Heat fixed at 205° C for 40 seconds and 1.5 psig (0.11 kg per sq cm gauge)
[g]Scoured in hot water (65° C) containing "Lakeseal" detergent
[h]Steam fused at 100° C and 1 atm for 10 to 15 seconds
[i]Scoured in 2 parts/liter sodium hydrosulfite, 2 parts/liter soda caustic and 2 parts/liter polyethoxylated tridecanol surfactant at 65° C
[j]Hot air fixation at 205° C for 100 seconds
[k]Heat fixation at 205° C for 100 seconds and 1.5 psig (0.11 kg per sq cm gauge)
[l]Includes 2% by weight of benzanilide carrier
[m]Includes 4% by weight of benzanilide carrier
[n]Includes 6% byweight of benzanilide carrier
[o]Includes 8% by weight of benzanilide carrier
[p]High temperature steam fixation at 182° C for 8 minutes
[q]High pressure steam fixation at 22 psig (1.55 kg per sq cm gauge) for 1 hour
[r]
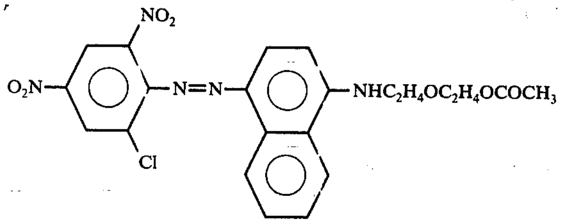

[s]
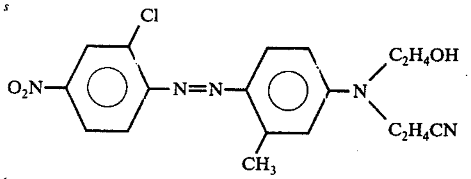

[t]Infrared fusion at 160-170° C
[u]Fabric sprayed with 50% aqueous citric acid before fixation
[v]Cottage-steamed at 7 psig (0.49 kg per sq cm gauge) for 1 hour
[w]Includes 1% by weight of citric acid
[x]Includes 2% by weight of citric acid
[y]Scoured at 60° C with 2 parts/liter of polyethoxylated oleyl alcohol and 2 parts/liter of alkyltrimethylammonium bromide surfactants
[z]Includes 1% by weight of ammonium oxalate
[aa]1,5 NDS = 15-naphthalenedisulfonate
[bb]2,4 DNBS = 2,4-dinitrobenzenesulfonate
[cc]
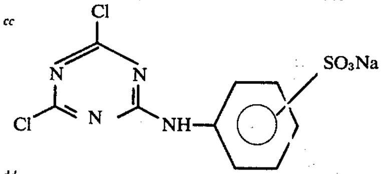

[dd]High temperature steam fixation at 182° C for 20 minutes
[ee]Overdyed with 0.5% owf of dye (D) of Table VII
[ff]Overdyed with 0.5% owf of dye (E) of Table VII
[gg]Overdyed with 0.5% each of dye (D) and dye (E) of Table VII

TABLE VII

A.

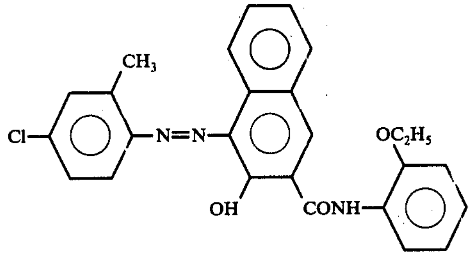

B.

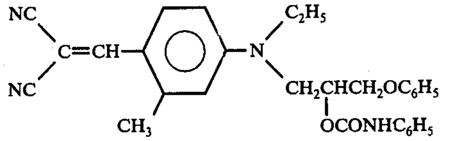

C.

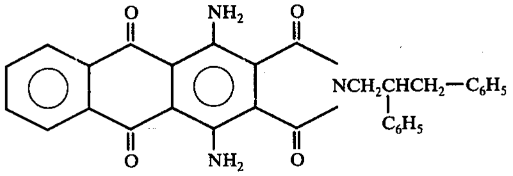

D.

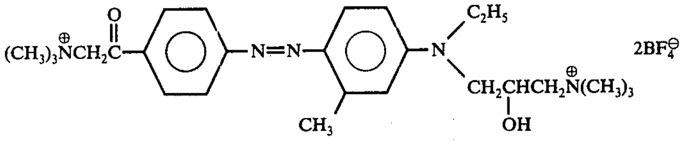

E.

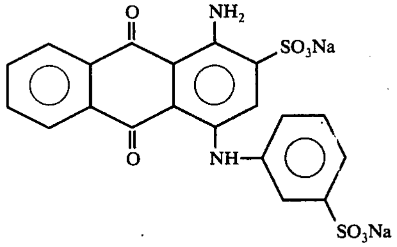

F.

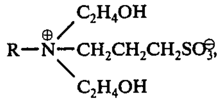

where $R = C_{16}$ alkyl (~30%)
$C_{18}$ alkyl (~30%)
$C_{18}$ monounsaturated (~40%)

G.

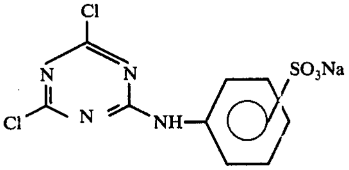

We claim:

1. Magnetic printing process comprising:

(a) forming a magnetic image on a ferromagnetic material which is imposed on an electrically conductive support;

(b) developing the magnetic image by decorating the image with a ferromagnetic toner comprising a ferromagnetic component, a dye and/or chemical treating agent and a water-soluble or water-solubilizable resin which substantially encapsulates the ferromagnetic component and the dye and/or chemical treating agent;

(c) transferring the developed image to a substrate;

(d) permanently fixing the dye and/or chemical treating agent of the image on the substrate; and (e) removing the ferromagnetic component and the resin from the image on the substrate.

2. Process of claim 1 wherein the resin of step (b) is a thermoplastic resin.

3. Process of claim 1 wherein the chemical treating agent of step (b) is selected from the group consisting of flame-retarding agents, biocides, ultraviolet light absorbers, fluorescent brighteners, dyeability modifiers, soil-release agents and water-proofing agents.

4. Process of claim 3 wherein the dyeability modifier is a chemical resist.

5. Process of claim 1 wherein the ferromagnetic component and the resin are removed from the image in step (e) by means of an aqueous scour.

6. Process of claim 5 wherein the scouring is effected with an aqueous surfactant solution at less than 100° C in less than five minutes.

7. Process of claim 5 wherein the scouring is effected with an aqueous alkali solution at less than 100° C in less than five minutes.

8. Process of claim 1 wherein the substrate of step (c) is an intermediate substrate to which the image is adhered and the adhered image is subsequently transferred to a second substrate on which the dye and/or chemical treating agent are permanently fixed in step (d).

9. Process of claim 8 wherein the intermediate substrate is paper.

10. Process of claim 8 wherein the substrate on which the dye and/or chemical treating agent are permanently fixed is a polyester.

11. Process of claim 8 wherein the adhering of the image is effected through partial dissolution of the resin in water.

12. Process of claim 11 wherein the partial dissolution of the resin in water is effected by steaming the image at 100° C for 1 to 15 seconds at 760 mm of pressure.

13. Process of claim 8 wherein the adhering of the image is effected by melting the resin.

14. Process of claim 13 wherein the melting of the resin is effected by heating the image at 90° to 170° C.

15. Process of claim 8 wherein the dye and/or chemical treating agent are permanently fixed on the substrate by heating at 160° to 250° C at a pressure of 0.07 to 0.14 kg per sq cm for up to 100 seconds.

16. Process of claim 1 wherein the substrate on which the dye and/or chemcial treating agent are premanently fixed is a textile fabric.

17. Process of claim 16 wherein the textile fabric is a polyester fabric.

18. Process of claim 16 wherein the textile fabric is a polyester/cotton blend fabric.

19. Process of claim 16 wherein the textile fabric is a fabric of a natural or regenerated cellulose or cellulose derivative.

20. Process of claim 19 wherein the textile fabric is a cotton fabric.

21. Process of claim 19 wherein the textile fabric is a cellulose acetate fabric.

22. Process of claim 19 wherein the textile fabric is a cellulose triacetate fabric.

23. Process of claim 16 wherein the textile fabric is a polyamide fabric.

24. Process of claim 23 wherein the textile fabric is a synthetic polyamide fabric.

25. Process of claim 23 wherein the textile fabric is a wool fabric.

26. Process of claim 16 wherein the textile fabric is a fabric of an acid-modified polyester.

27. Process of claim 16 wherein the textile fabric is a polyacrylonitrile fabric.

28. Process of claim 1 wherein the substrate on which the dye and/or chemical treating agent are permanently fixed is a film.

29. Process of claim 28 wherein the film is paper.

30. Process of claim 28 wherein the film is a polyester film.

31. Process of claim 1 wherein the ferromagnetic material of step (a) is acicular $CrO_2$.

32. Process of claim 1 wherein the resin of step (b) is solubilizable in water in less than five minutes at less than 100° C.

33. Process of claim 1 wherein the resin of step (b) is a readily fusible, natural, modified natural or synthetic resin or polymer.

34. Process of claim 1 wherein the ferromagnetic component of step (b) consists of hard magnetic particles.

35. Process of claim 34 wherein the hard magnetic particles are $Fe_3O_4$ particles.

36. Process of claim 34 wherein the hard magnetic particles are $CrO_2$ particles.

37. Process of claim 1 wherein the ferromagnetic component of step (b) consists of soft magnetic particles.

38. Process of claim 37 wherein the soft magnetic particles are iron particles.

39. Process of claim 1 wherein the ferromagnetic component of step (b) consists of a binary mixture of hard and soft magnetic particles.

40. Process of claim 39 wherein the hard and soft magnetic particles are $Fe_2O_4$ particles and iron particles, respectively.

41. Process of claim 39 wherein the hard and soft magnetic particles are $CrO_2$ particles and iron particles, respectively.

42. Process of claim 1 wherein the electrically conductive support is a metallized dielectric film.

43. Process of claim 42 wherein the metallized dielectric film is an aluminized polyester film.

44. Process of claim 1 wherein the electrically conductive support is a metallized plastic material.

45. Process of claim 1 wherein the electrically conductive support is an electrically conductive metal.

46. Process of claim 45 wherein the metal is copper.

47. Process of claim 45 wherein the metal is nickel.

48. Process of claim 45 wherein the metal is aluminum.

49. Process of claim 1 wherein the electrically conductive support comprises neoprene containing conductive particulate matter uniformly dispersed therein.

50. Process of claim 49 wherein the particulate matter is carbon black.

51. Process of claim 1 wherein the electrically conductive support comprises an epoxy resin containing conductive particulate matter uniformly dispersed therein.

52. Process of claim 51 wherein the particulate matter is silver.

53. Process of claim 1 wherein the electrically conductive support is a grooved surface and the ferromagnetic material is in the grooves.

54. Process of claim 53 wherein the electrically conductive grooved support is a conductive, metal-coated, plastic grooved support.

55. Process of claim 53 wherein the electrically conductive grooved support is an electrically conductive metal.

56. Process of claim 55 wherein the metal is copper.

57. Process of claim 1 wherein the developed image of step (c) is electrostatically transferred to the substrate.

58. Process of claim 57 wherein electrostatic transfer is effected by applying a voltage of 1 to 20 kilovolts.

59. Process of claim 58 wherein the voltage is a negative potential.

60. Process of claim 1 wherein the developed image of step (c) is pressure transferred to the substrate.

61. Process of claim 60 wherein the pressure transfer is effected using a pressure of 0.36 to 7.15 kg per linear mm.

62. Process of claim 1 wherein the developed image of step (c) is magnetically transferred to the substrate.

63. Process of claim 1 wherein the permanent fixation of the dye and/or chemical treating agent in step (d) is effected by dry heat treatment at 190° to 230° C for up to 100 seconds.

64. Process of claim 1 wherein the permanent fixation of the dye and/or chemical treating agent in step (d) is effected by high pressure steaming at a pressure of 0.7 to 1.8 kg per sq cm gauge.

65. Process of claim 1 wherein the permanent fixation of the dye and/or chemical treating agent in step (d) is effected by high temperature steaming at a temperature of 150° to 205° C.

66. Process of claim 1 wherein the permanent fixation of the dye and/or chemical treating agent in step (d) is effected by means of saturated steam at a pressure of 0.07 to 0.49 kg per sq cm gauge and 100% relative humidity.

67. Process of claim 1 wherein the permanent fixation of the dye and/or chemical treating agent in step (d) is effected by rapid aging at 100 to 105° C for 15 to 45 minutes at 760 mm of pressure.

68. Process of claim 1 wherein the permanent fixation of the dye and/or chemical treating agent in step (d) is effected by heating at 190° to 230° C and applying a pressure of up to 0.11 kg per sq cm gauge for up to 100 seconds.

69. Process of claim 1 wherein the dye of step (d) is a disperse dye.

70. Process of claim 1 wherein the dye of step (b) is cationic dye.

71. Process of claim 1 wherein the dye of step (d) is an acid dye.

72. Process of claim 1 wherein the dye of step (d) is a premetallized acid dye.

73. Process of claim 1 wherein the dye of step (b) is a vat dye.

74. Process of claim 1 wherein the dye of step (b) is a sulfur dye.

75. Process of claim 1 wherein the dye of step (b) is a fiber-reactive dye.

76. Process of claim 1 wherein the dye of step (b) is a mixture of a disperse dye and a fiber-reactive dye.

77. Process of claim 1 wherein the dye of step (b) is a salt of a dye cation and an arylsulfonate anion.

78. Process of claim 1 wherein a plurality of magnetic images corresponding to a series of color separation film positives of an original multicolored design are formed, each magnetic image is developed with a different ferromagnetic toner, each toner containing an appropriate dye, and each developed image is transferred to the substrate in register and superimposed one on top of the other so as to form a multicolored print corresponding to the original multicolored design.

79. Magnetic apparatus comprising a ferromagnetic material which is imposed on an electrically conductive support; means for forming a magnetic image on the ferromagnetic material; means for developing the magnetic image with a toner comprising a ferromagnetic component, a dye and/or chemical treating agent and a water-soluble or water-solubilizable resin; means for transferring the developed image to a substrate; means for fixing the dye and/or chemical treating agent on and/or in the substrate; and means for removing the ferromagnetic component and the water-soluble or water-solubilizable resin from the substrate.

80. Apparatus of claim 79 which includes means for forming a magnetic image of a print design.

81. Apparatus of claim 79 which includes means for forming a magnetic image of a colored print design.

82. Apparatus of claim 79 wherein the ferromagnetic material is acicular $CrO_2$.

83. Apparatus of claim 79 which includes means for permanently fixing the dye and/or chemical treating agent on and/or in the substrate.

84. Apparatus of claim 83 wherein the permanent fixation means is a steam heating means.

85. Apparatus of claim 83 wherein the permanent fixation means is an infrared heating means.

86. Apparatus of claim 79 wherein the means for transferring the developed image is an electrostatic means.

87. Apparatus for claim 79 wherein the means for transferring the developed image is a magnetic means.

88. Apparatus of claim 79 wherein the means for transferring the developed image is a pressure means.

* * * * *